(12) United States Patent
Talbot et al.

(10) Patent No.: US 6,356,859 B1
(45) Date of Patent: Mar. 12, 2002

(54) PROCESS MONITORING SYSTEM

(75) Inventors: Colin Talbot, East Sussex; Paul William Kuczora, Kent, both of (GB)

(73) Assignee: Interactuality Limited (GB)

( * ) Notice: Subject to any disclaimer, the term of this patent is extended or adjusted under 35 U.S.C. 154(b) by 0 days.

(21) Appl. No.: 09/381,078

(22) PCT Filed: Mar. 12, 1998

(86) PCT No.: PCT/GB98/00749

§ 371 Date: May 9, 2000

§ 102(e) Date: May 9, 2000

(87) PCT Pub. No.: WO98/41917

PCT Pub. Date: Sep. 24, 1998

(Under 37 CFR 1.47)

(30) Foreign Application Priority Data

Mar. 14, 1997 (GB) .............................................. 9705383
Jan. 19, 1998 (GB) .............................................. 9801065

(51) Int. Cl.⁷ .............................................. G06F 15/00
(52) U.S. Cl. ....................... 702/188; 702/119; 702/182; 702/22; 717/4; 717/5; 707/200
(58) Field of Search ................................ 702/188, 182, 702/108, 183, 186, 119, 123; 703/22; 717/4, 5, 1; 707/200

(56) References Cited

U.S. PATENT DOCUMENTS

| | | | |
|---|---|---|---|
| 5,042,006 A | * 8/1991 | Flohrer | 708/167 |
| 5,103,498 A | * 4/1992 | Lanier et al. | 706/58 |
| 5,333,302 A | 7/1994 | Hensley et al. | 395/575 |
| 5,335,188 A | 8/1994 | Brisson | 364/551.01 |
| 5,465,358 A | 11/1995 | Blades et al. | 395/700 |
| 5,577,247 A | * 11/1996 | Uyama et al. | 707/10 |
| 5,590,057 A | 12/1996 | Fletcher et al. | 364/551.01 |
| 5,774,724 A | * 6/1998 | Heisch | 717/4 |
| 6,164,841 A | * 12/2000 | Mattson, Jr. et al. | 716/1 |

FOREIGN PATENT DOCUMENTS

| | | |
|---|---|---|
| EP | 330944 | 9/1989 |
| EP | 524080 | 1/1993 |
| EP | 566228 | 10/1993 |
| GB | 2216264 | 10/1989 |
| GB | 2260627 | 4/1993 |
| WO | 9202880 | 2/1992 |

OTHER PUBLICATIONS

Denning D.E.; "An Intrusion–Detection Model;" *IEEE Transactions on Software Engineering*; vol. SE–13, No. 2; Feb. 1987; pp. 222–232.

Maes, P; "Agents that Reduce Work and Information Overload;" *Communications of the Association for Computing Machinery*; vol. 37, No. 7, pp. 31–40 and 146; Jul. 1994.

* cited by examiner

Primary Examiner—Marc S. Hoff
Assistant Examiner—Hien Vo
(74) Attorney, Agent, or Firm—Greer, Burns & Crain, LTD

(57) ABSTRACT

A system for monitoring a process controlled by a user. A code generated by user input is paired with a code generated by the process in response to the user generated code. With reference to a master profile of code pairs, in the form of a variable file or look-up table, it is established whether the pair of codes are recognized as an appropriate pairing. In the case that the process generated code has not been recognized a false context state is established and, in the case in which a process generated code has been recognized, either a true context state is established if the recognized process generated code is deemed to have been produced in an appropriate context having regard to a correlation between the user generated input code and the corresponding code of the code master profile pair associated with the recognized process code, else a false context state is established. A raw activity record then stores an activity code specific to each recognized process generated code and the associated determined context state. The activity record may then be used as a basis for influencing the progress of the process.

18 Claims, 22 Drawing Sheets

PROCESS MONITORING SYSTEM

This invention relates to a system for monitoring the activities of a process controlled by a user.

According to a first aspect of the invention, there is provided a system for monitoring the activities of a process controlled by a user, the system comprising:

means defining a master profile of pairs of first and second codes, the first codes being codes corresponding to codes generated by user input to the process and the second codes being codes corresponding to the codes generated by the process in response to the user generated codes;

means arranged to compare a pair of user and process generated codes with the master profile to deduce whether the process generated code of that pair is recognized as being one of the second codes defined in the master profile;

means for establishing the context of the process generated code wherein in the case that the process generated code has not been recognized by the comparing means a false context state is established and, in the case in which a process generated code has been recognised by the comparing means, either a true context state is established if the recognised process generated code is deemed to have been produced in an appropriate context having regard to a correlation between the user generated input code and the first code of the master profile pair associated with the recognised process code, else a false context state is established;

means arranged to store in a user activity file a record comprising an activity code specific to each recognised process generated code and the associated context state determined by the context establishing means.

In a first embodiment of the first aspect of the invention, the system comprises means for changing the manner in which the process is influenceable by the user on the basis of the user activity file.

In a variation of the first embodiment of the first aspect of the invention, the system comprise means for changing the manner in which the process operates on the basis of the user activity file.

In a second embodiment of the first aspect of the invention, the system comprises means for analyzing the contents of the user activity file and means for writing data relating to the analyzed contents of the user activity file to a user profile file.

In a third embodiment of the first aspect of the invention, the system of the second embodiment comprises means for changing the manner in which the process operates on the basis of the user profile file.

In a variation of the third embodiment of the first aspect of the invention, the system of the second embodiment comprises means for changing the manner in which the process is influenceable by the user on the basis of the user profile file.

In a fourth embodiment of the first aspect of the invention, the system of the second or third embodiments comprises means for analyzing the contents of the user profile file and means for writing data relating to the analyzed contents of the user profile file to a process activity file.

In a fifth embodiment of the first aspect of the invention, the system of the fourth embodiment comprises means for changing the master profile on the basis of the process activity file, whereby the manner in which the user profile file analyzing means analyses user profile files is changed.

Further aspects of the invention are exemplified by the attached claims.

There are many applications in which embodiments of the invention may be used.

In a first group of applications, the monitoring system controls the interaction between a process consisting of or controlled by a computer program and human users of that process. The human users may be interfacing with the computer program via means typical for a human-machine interface such as keyboard and mouse. Alternatively, the human users may be interfacing with the computer via other input/output devices of the computer running the program, such as intelligent sensor units that form part of a machine control system, e.g. a flight simulator.

In a second group of applications, the monitoring system controls the interaction between a process consisting of or controlled by a computer program and another process consisting of or controlled by a another computer program. The other computer program may be running on the same computer, i.e. intra-computer process, or on another computer, i.e. inter-computer process.

The process might be one controlled by, or which is, a computer program. The user may for example be a person interacting with the computer program via one or more input devices of the computer performing the process, or another program running on the same computer or on a different computer.

In many automated processes, the process activities are carried out by a process controller in a manner which will depend upon instructions given from another party to the process controller. Moreover, in many instances, the instructions given from the other party to the process controller are given in response to prompts from the process controller, so that there is a two-way communication, i.e. interaction, between the process controller and the other party.

In a first example a computer is the process controller and controls a process taking account of input from a human acting as the user. The computer outputs data, such as selection options, to the user via the screen and the user inputs data to the computer, such as selection decisions, by mouse clicks on icons.

In this example, the process may comprise activities performed by a piece of applications software, such as a computer aided technical drawing package, and the process control may also be incorporated in the application software. The user interacts with the application software, the application software with the operating system and the operating system with the hardware of the computer. The user of the application software may be an expert, a novice or have specific weaknesses and strengths having regard to using the application software to its full capabilities. The user may for example be an expert at computer aided technical drawing, but unfamiliar with the particular drawing package. The system can establish from the process activities carried out by a specific user and the manner in which that user invokes those process activities what the competence and standard level of that user are and can control the process and influence the manner in which the process controller interacts with that user accordingly.

In a second example, a computer controls a process of data transmission to another computer via a data transmission line interconnecting the two computers, for example a network or internet connection. Alternatively, in this second example, the process may be data transfer within the same computer, for example between different application software programs via the operating system or between different hardware elements via the bus. If the one computer receives a request from the other computer, for example via the internet, to transfer a data file containing text, the computer that requests the file may already have a decoder for certain text file formats which may or may not include that of the text in the requested file. Even if the computer requesting the file does not have a decoder for the text file format of the requested file, it may have a decoder for another text file format that is also held by the computer from which downloading was requested. One or both of the computers, acting as a process controller, can have a user specific file relating to the other of the computers, acting as a user, and thus tailor the data communication to take account of their respective capabilities. The system can moreover serve to transfer additional data, such as a decoder, from one computer to the other if this is deemed to be worthwhile on the basis of an assessment of past and present activities. For example, if a user activity file of a website PC computer held in a mainframe computer indicates repeated downloading of graphics in bitmap form from the mainframe computer, the mainframe computer could decide to download relevant graphics languages to the website computer to increase data communication efficiency.

In a third example, a controller forms part of a process for controlling the lighting and heating in an office building having multiple zones. The controller may perform control according to monitoring of the switching states of light switches and the settings of thermostats within the building. The occupants of the different rooms will have different habits such as working hours, diligence in turning lights and heating off when leaving work, desired brightness levels and desired ambient temperature during work time. For example, a particular office worker may habitually set his air conditioning control to have his office relatively cold during spells of cold weather and relatively warm during warm weather, whereas another office worker may habitually always set his air conditioning control to have his office at around 20 degrees regardless of outside temperature and season. The controller can thus be responsive to user behaviour by monitoring to compile user activity profiles and other user specific profiles. Control can then be tailored accordingly and building supervisors can be provided with a record of anomalous activities.

In a fourth example, a controller forms part of a vehicle, e.g. an automotive vehicle or an aircraft perhaps having a fly-by-wire avionics system. The controller utilises sensors to monitor items such as brakes, throttle and other manually controllable parts of the vehicle and may inform the driver or pilot via a display of information such as instant fuel consumption or speed. Thus, at least some activities of the process involve interaction between the user and the process, since the effects on the process of the user's input to the process controller are fed back to the user. The controller may control ignition timing, fuel injection, automatic gear change and braking in accordance with the nature of different drivers characterised by different reaction times, experience aggression etc. User specific profiles can thus be built up. The monitoring function can be used to provide information recording the use of the vehicle, which can then be used by mechanics when servicing the vehicle. The control function can be used while the vehicle is being driven to reduce emissions, increase braking efficiency etc.

In all these examples, the efficiency with which the activities of the process are carried out will depend on the capabilities or characteristics of the communicating parties and most especially the manner in which each party acts towards the other party. Thus, the process will receive input that will vary depending on the individual characteristics of a third party whom we shall call the user, the user in the four examples mentioned above being: the person running the software; one of the computers; the office workers; and the driver or pilot. The above-described applications of the invention monitor these activities and generate user specific activity profiles which can then be used for example: by a human system supervisor to assess process performance; by an automated system controller automatically to modify the process according to an assessment of the user concerned; and/or by an automated system controller automatically to modify the interaction between the process and the user concerned.

In examples in which the process being monitored by the process monitoring system is under software control by a process controlling program, a significant advantage of the process monitoring system as described herein is that it can be designed so that the only necessary point of connection between the process monitoring system and the process controlling program is the interface between the user and the process controlling software. That is, the process monitoring system can be designed so as to rely solely on monitoring software or machine codes generated by user activity and the direct response of the process controlling software to that user activity in the form of the codes generated by the process controlling software. Consequently, access to, and knowledge of, the process controlling software, such as access to the softwares executable files or data files and knowledge of their format, will not be required by the process monitoring system.

European patent application no. 89102855.7 and International patent application no. PCT/US91/05062 both disclose systems which monitor a user's use of an application and offer flexible help accordingly. However these systems require access to the application software's executable files.

For a better understanding of the invention, and to show how the same may be carried into effect, reference will now be made, by way of example, to the accompanying drawings, in which:

FIG. 1 shows schematically a first embodiment of the invention, which is an example of a monitoring system 5 which interfaces between a user and a computer-controlled process to monitor the user's usage of the process to provide data that can enable the user-process interaction to the controlled. The process may be, or be controlled by, application software.

Figure 1:
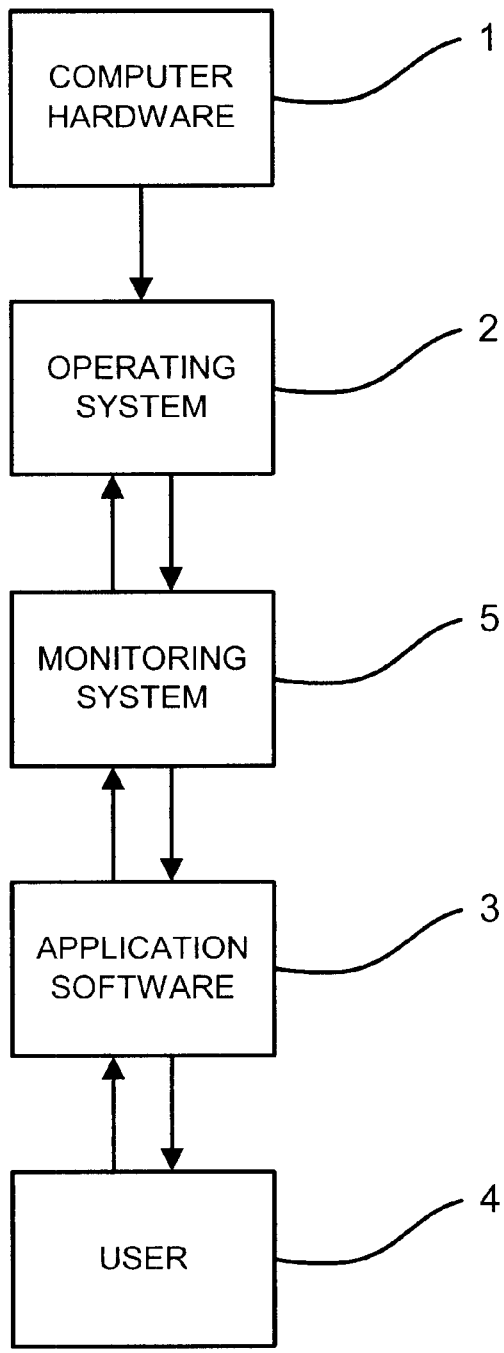
FIG. 1 is a schematic diagram of the monitoring system of a first embodiment of the invention.

This embodiment comprises a computer system including computer hardware 1, an operating system 2, application software 3 and a user 4, all otherwise as usual in a computer system having application software, e.g. a CAD package. Introduced into this structure is a monitoring system 5 which in this example is implemented by a set of programs and which acts to monitor and record activity of the user 4 and application software 3 and control the interaction of the user 4 and software 3 accordingly.

Figure 2:
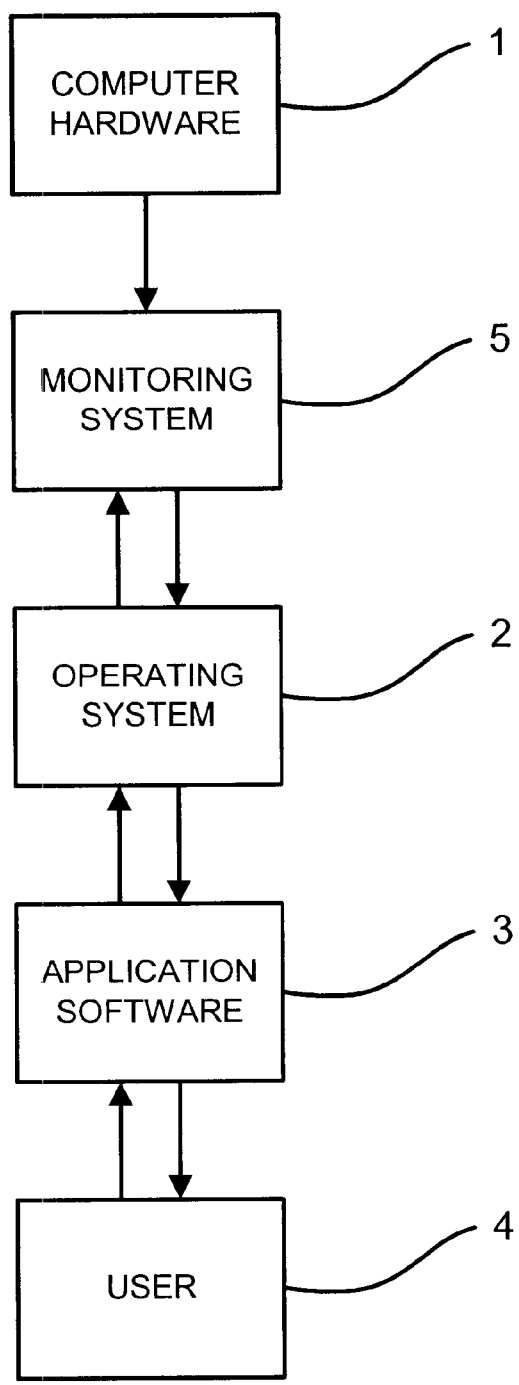
FIG. 2 is a schematic diagram of the monitoring system of a second embodiment of the invention.

A further embodiment is shown in FIG. 2 in which the monitoring system 5 is arranged between hardware 1 and operating system 2 and which acts to monitor and record activity of the computer hardware 1 and operating system 2 and control the interaction of the hardware and operating system accordingly. This further embodiment is not described further at this stage, but is referred to here to illustrate that monitoring systems 5 embodying the invention may be utilised at different levels in a layered system.

Returning to the embodiment of FIG. 1, the application software is considered to be structured as a set of topics which may be distinct operations and which may or may not normally occur sequentially. Each topic is subdivided in tree fashion, e.g. into sections, and each section may be subdivided into elements (which we shall call pages) and so on as necessary. In each topic, the sections may or may not normally be intended to occur sequentially and in each section the pages likewise may or may not be intended to occur sequentially. The particular selection of subdivisions and their number depends upon the application software and the monitoring, and optionally subsequent control, intended to be applied to it.

As will be described in more detail hereinafter, a plurality of master profile files is pregenerated to define various aspects of the application software. There is for example a master profile containing data relating to the application software codes that can be generated at the different nodes of the tree structure, this master profile being referred to in the following as the code master profile. There is also for example a master profile containing data relating to expected and desired routes through the application software, this master profile being referred to in the following as the progression route master profile.

In the following, we will take, purely as an example of application software, multimedia training software on compact disc (CD) and running on the same computer as the monitoring system 5, the monitoring system being used to monitor the activity of the multimedia training application software, as at least partially affected by input from the user, and to control the subsequent activities of the application software in a manner which takes account of previous user input.

Illustrative examples are given throughout the following description of the first embodiment in terms of application software for multimedia training of lathe machinists.

Figure 3:
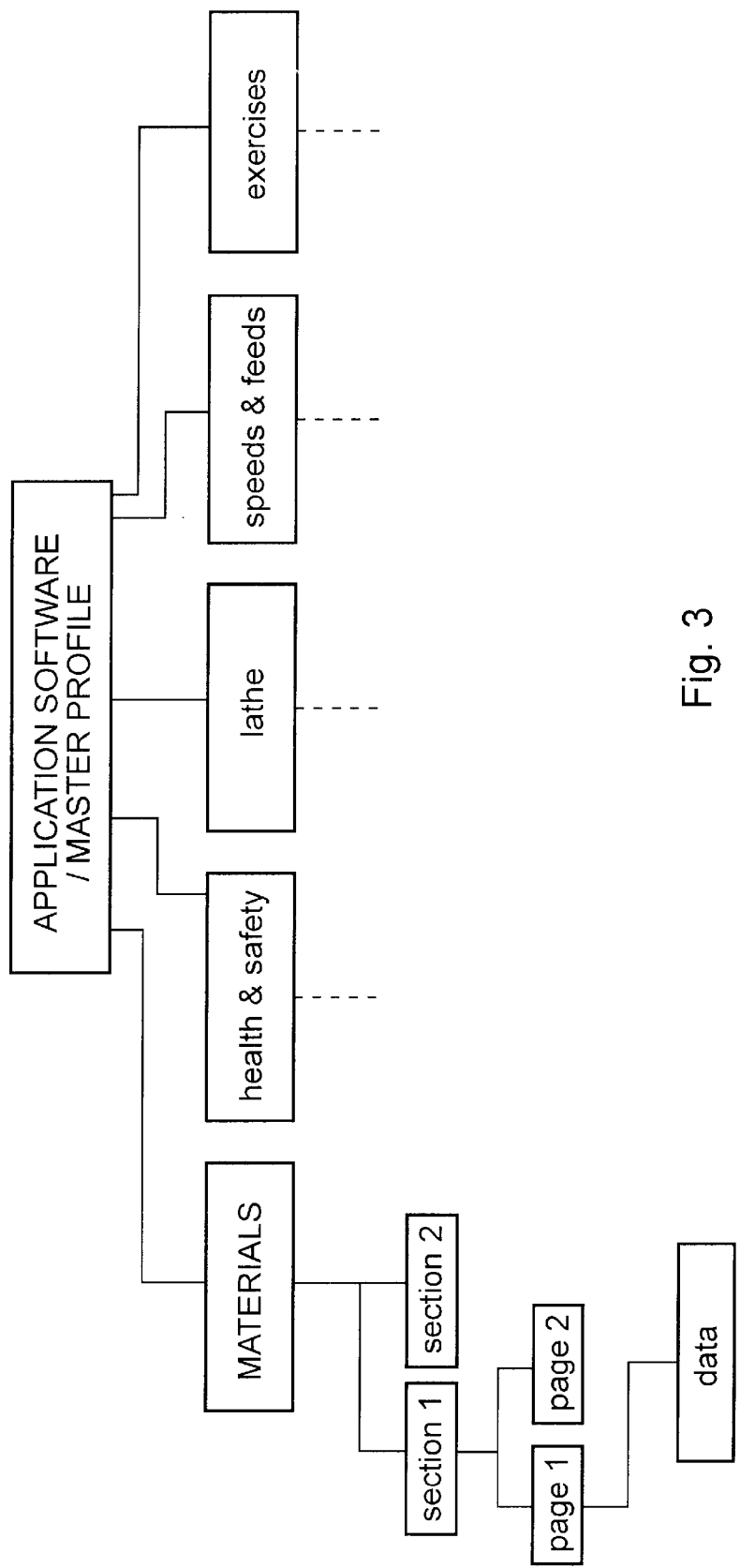
FIG. 3 is a tree diagram showing the structure of a lathe machinists' training program which is used as an example of application software controllable with the monitoring system of FIG. 1.

The structure of the multimedia lathe machinists' training program is shown in tree form in FIG. 3. The application software is subdivided into topics relating to different aspects of lathe machinists' practice, such as teaching material on materials properties and on health and safety, as well as a lathe simulator including real-time three-dimensional lathe simulation. The topics are subdivided into sections and sections into pages, the pages containing text, graphics, video presentations and the like.

The monitoring system 5 includes software for monitoring activity of a user using the application software via a converter 10 which is now to be described with reference to FIGS. 4 and 5, which show the structure of and flow through the converter 10.

Figure 4:
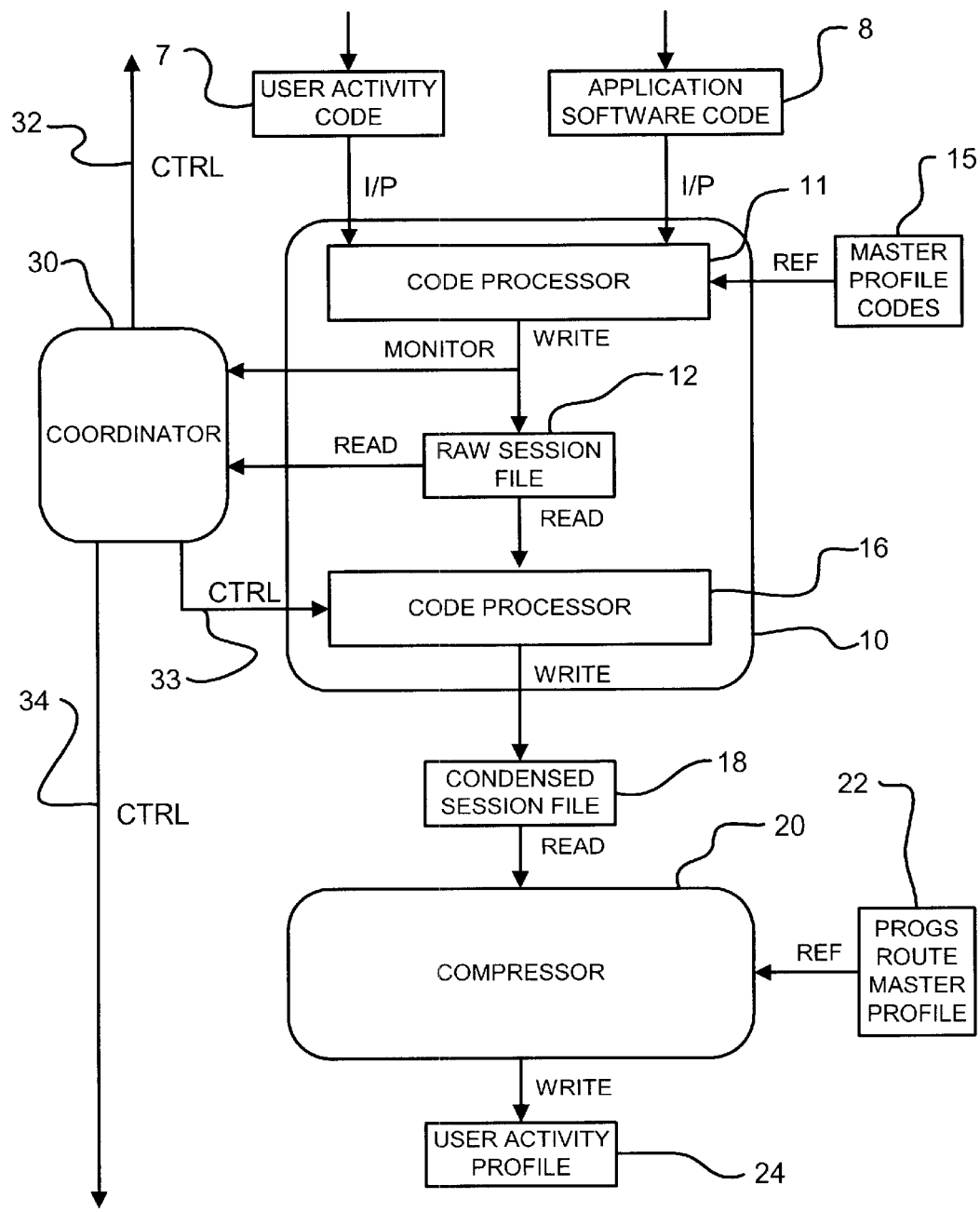
FIG. 4 is a schematic diagram of a converter and compressor for a monitoring system according to the first embodiment.
Figure 5:
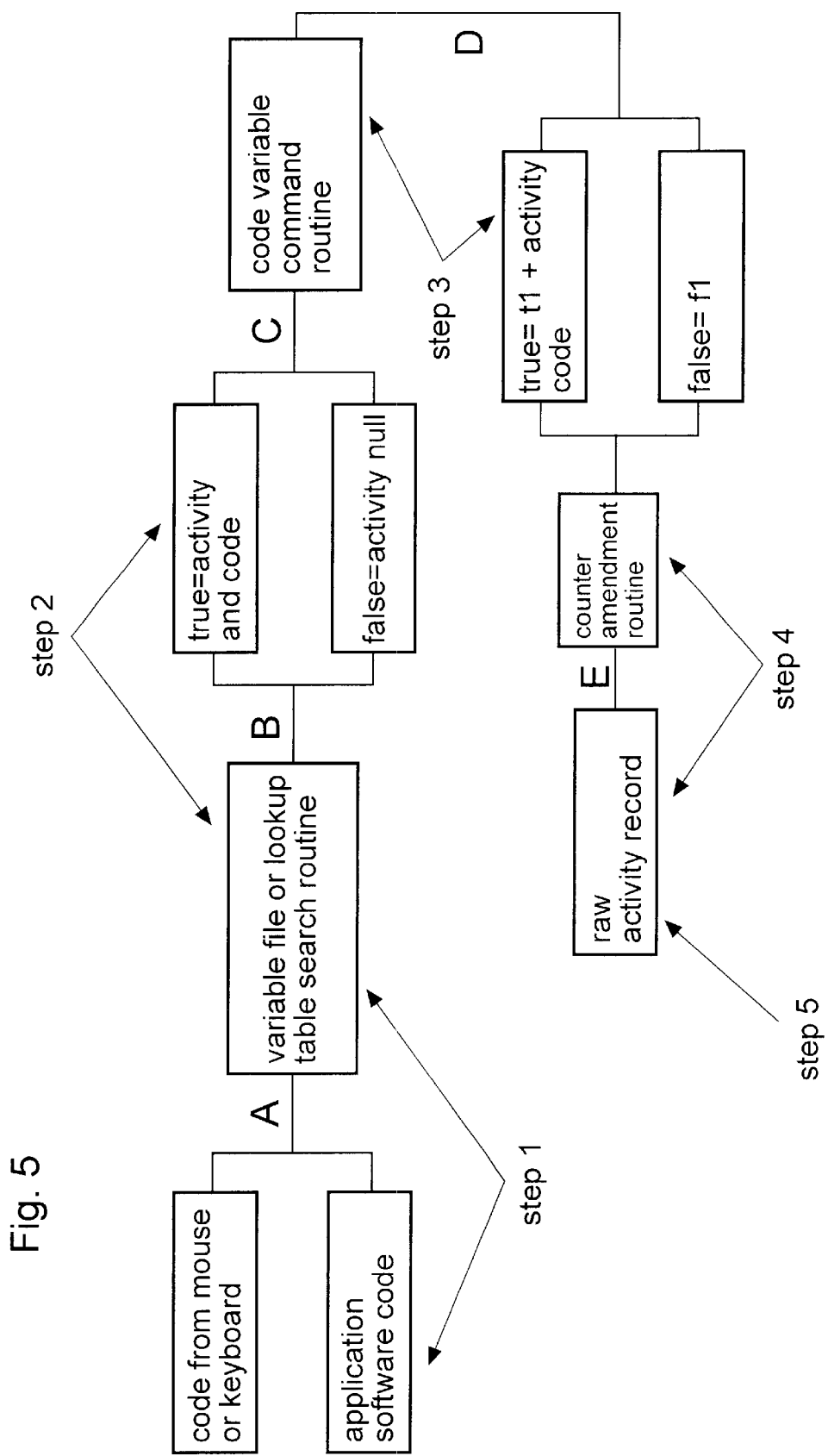
FIG. 5 is a schematic diagram of the flow through the converter of FIG. 4.

The converter 10 of the monitoring software is operable to monitor the application software and operating system to pick up and pair a user activity code 7 and an application software code 8, as shown schematically in the upper portion of FIG. 4 and 'Step 1' of FIG. 5. Depending on the application software and the monitored activities, the converter 10 could instead monitor the system bus to pick up either one or both of the user activity code 7 and the application software code 8.

The converter 10 thus exploits the fact that, when running the application software, each user command to the application software, executed for example with a mouse and/or keyboard, generates a code and, in direct response thereto, the application software generates a code also, these codes being available to the monitoring software via the accessing of memory addresses associated with particular operating system functions or via monitoring of the system bus. Thus, in a Windows system, these codes can be read from the message queue.

An input code processor of the converter 10 processes these paired codes with reference to a master profile of codes 15 and then writes a result representative of the user activity in the context of the application software 3 as a record to a file referred to in the following as a raw session file 12.

This process is now described in more detail with reference to FIG. 5 which shows the flow through the converter 10.

The paired codes, referred to as the application code 8 and the user activity code 7 in the following notation of the record structure, are picked up by the converter 10 at the point in the flow marked A in FIG. 5 with the record structure:

<application code><user activity code>, where the items in < > are respective fields of the record. A converter routine then searches the code master profile 15 for an application code which matches the input application code.

The code master profile 15 can have the form of a look-up table or variable file and is a preprepared file of records. Taking the example in which the code master profile 15 has a tabular form, the first column or field of the table may be a list of application codes for the application software. The second column or field may contain the user activity codes, e.g. mouse code, the user activity code 7 of each line being that envisaged to be paired with the application software code of the same line. The third column or field contains an output code for use by the monitoring software and representative of the input application code. The lines of the code master profile 15 thus have the record structure:

<application code><user activity code><output code>

If the converter routine of the code processor 11 finds a match of the input application code and the application code of the code master profile 15, the routine outputs the output code as a first field <output code> of a record which we shall refer to as the converter record. If there is no match, then that field of the record contains a dummy or nul code value indicative of no recognized code.

If an application code match exists, the converter routine then compares the user activity code 7 in the second field of the identified record or line of the code master profile 15 with the input user activity code 7. If the user activity codes match then a logical variable of the converter record, referred to in the following as 'activity', is set true 't', otherwise this logical variable is false 'f'. The converter record thus has at this point, marked B in FIG. 5, the record structure:

<output code><activity(t/f)>

At this point an entry is generated in a count field of the converter record. This entry will be set to 0 if the output code is the nul code and 1 otherwise, i.e. if the input application code has been recognized. The converter record thus has at this point, marked C in FIG. 5, the record structure:

<output code><activity(t/f)><count>

The converter routine then looks at the count value. If the count value is zero, i.e. application code not recognized, the routine ceases processing of the current input code pair and returns to the start. If the count value is one, i.e. application code recognized, the routine adds a time value onto the converter record which in the following examples is the real time elapsed in seconds since the last allocated time value. However, an absolute time could be used. The converter record thus has at this point, marked D in FIG. 5, the record structure:

<output code><activity(t/f)><count><time>

The converter routine then compares the output code with that of the previous converter record. If these match, then the routine tests whether the time value in the processing record is less than a preset threshold and if yes then the count value is changed from 1 to 0. This allows accidentally repeated codes, e.g. from double mouse clicks, to be filtered out, in a manner which will be understood shortly. The converter record thus has at this point, marked E in FIG. 5, the same record structure as at point D, but possibly with a modified count value, i.e.:

<output code><activity><count><time>

The initial phase of processing is now complete and the converter record is written to a file referred to in the following as a raw session file 12. In general, the session file can have any predetermined file format that reflects the application software under control and has a content specific to the current user. Each line of the raw session file 12 has the structure:

<output code><activity><count><time><condensed> where 'condensed' is a logical variable set at this stage to a false state to indicate that this line of the raw session file 12 has not yet been condensed, the meaning of which will be understood shortly.

The raw session file 12 comprises two sequential lists of converter records, one for the converter records having 'false' user activity codes and another for the converter records having 'true' user activity codes, e.g.:

$$\langle gm \rangle \langle t \rangle \langle 1 \rangle \langle 180 \rangle \langle f \rangle$$

$$\langle gmm \rangle \langle t \rangle \langle 1 \rangle \langle 30 \rangle \langle f \rangle$$

$$\langle gm \rangle \langle t \rangle \langle 1 \rangle \langle 5 \rangle \langle f \rangle$$

$$\langle gmm \rangle \langle t \rangle \langle 1 \rangle \langle 40 \rangle \langle f \rangle$$

$$\vdots$$

$$\langle gp \rangle \langle f \rangle \langle 1 \rangle \langle 37 \rangle \langle f \rangle$$

$$\langle gmm \rangle \langle f \rangle \langle 1 \rangle \langle 8 \rangle \langle f \rangle$$

where 'gm' indicates goto materials topic; 'gmm' indicates goto main menu; and 'gp' indicates goto page, these being exemplary output codes.

Considering only the true codes at this stage, the trainee in this example has thus spent 180 seconds in the topic 'materials', then gone back to the 'main menu' and, after 30 seconds, reselected 'materials'. He has then gone straight back to the main menu after only 5 seconds.

The master profile of codes, or code master profile 15, is the first of several master profiles which are parts of the monitoring software having a record structure configured in a manner specific to the application software to be controlled.

At this point it is noted that in this implementation the application software is configured such that each command of the application software relevant to the monitoring software generates a unique application software code 8, so that each relevant command of the application software is uniquely identifiable in the master profiles.

In the present example of multimedia software, the application software is automatically configured in a suitable form by authoring software, e.g. AimTech's IconAuthor or MacroMedia's Director. By contrast for other kinds of software, such as standard application software, it may be necessary to adapt the output from the application software or the input to the monitoring software so that the uniqueness criterion is met for the code pairs to which the code master profile 15 is applied.

In the present specific example of multimedia training software for lathe machinists on CD-ROM, the application software has the structure shown in FIG. 5 and the code master profile 15 will have a corresponding record structure.

In general, the master profiles of the monitoring software will have a record structure that mimics the structure of the application software being controlled. This allows the application codes and output codes of the code master profile 15 to be incremental rather than absolute in nature. By incremental it is meant that the application codes and corresponding output codes stored in the code master profile 15 do not individually carry sufficient information to allow the position within the application software to be determined absolutely. The absolute position is however subsequently ascertainable from the context of the occurrence of a code amongst previous and subsequent codes and with reference to the progression route master profile containing information relating to the structure of the application software.

Taking an example, with reference to FIG. 5, the code master profile 15 has a code 'goto section 1', but does not have individual codes for 'goto materials section 1' and 'goto health-and-safety section 1' etc. The codes do not need to be absolute because the data in the session file can be rendered absolute at a later stage from the context of the code in the session file. For example, if the line in the session file immediately previous to 'goto section 1' is 'goto material topic' then it follows that the section referred to is 'material section 1'.

The incremental, non-absolute nature of the codes collected in real-time by the converter 10 has the advantage of allowing the size of the code master profile 15 and the length of the codes stored in it to be significantly reduced, with corresponding speed increases in the real-time monitoring routines, so that slowing of the running of the application software by the monitoring software can by kept to acceptable, preferably insignificant, levels. The session file generated in real-time by the converter 10 during the running of the application software can then be processed at a later time, for example when the application software is not active, such as when a user of the application software has paused to consider options being displayed on the screen.

EXAMPLE 1
(Application Software Code Recognised and Envisaged)

A trainee clicks an icon to select 'materials' as a topic in the application software. A pair of codes appears at the input of the converter 10. These are read by the converter routine and an activity parameter is set to 1. The converter 10 then runs a routine for applying the pair of codes to the first two fields of the code master profile 15. A match is found in a line of the code master profile, e.g. line 43. In response to the match, an output code is read from line 43, field 3 and written to the converter record, having the structure of a line of the user session file, together with a logical parameter 'true' (t) indicating that a match has been established. The output code is for example "gm", i.e. goto (g) materials topic (m), and the record is <gm><t><l><time>.

EXAMPLE 2
(Application Software Code not Recognised)

A trainee is multitasking the application software under the control of the monitoring software with another unrelated piece of software such as a database. When the trainee is using the unrelated software, software codes are generated and are picked up by the converter 10 of the monitoring software together with a user activity code 7 such as a mouse click code. The processing routine of the converter 10 then determines that the application software code 8 is not one present in field 1 of any of the code master profile, i.e. that the software code picked up from the bus by the converter 10 is not recognized as being a software code of the application software under control. There is thus no output code since no output code can be identified and, as a result, the activity parameter is changed from 1 to 0. The converter record contains <an><f><O><time>i.e. activity nul (an)/ false activity (f) and zero count, indicating that an activity has been picked up which is not recognised as being related to the application software under control. At the end of the routine for processing a pair of input codes, nothing is written to the session file owing to the O value of the count. The converter 10 thus filters out activity which cannot be meaningfully further processed by the monitoring software, thus serving to prevent processor time being taken up non-usefully.

EXAMPLE 3
(Recognised Application Software Code but not Envisaged)

As in Example 1, a trainee clicks an icon to select 'materials' as a topic in the application software. However, although the application software code 8 is recognised, the user activity code stored at that line of the code master profile 15 does not match the input user activity code 7. As a result an output code is produced but the activity parameter is set false, e.g. the converter record contains <gm><f><l><time> i.e. <goto materials (gm)><false activity (f)> at the end of the code pair processing the activity string is written to a new line of the session file.

The situation of Example 3 will arise for example when a trainee selects an option which the designer who set up the code master profile 15 did not envisage. The trainee may thus be following a path within the application software which is not sensible, or a path which is sensible but which was not considered by the system administrator. In addition, the time of the "false" activity is logged in the session file. Consequently, it is possible at a later stage to reconstruct from the session file non-envisaged execution paths and analyze their significance. These functions are carried out by higher order parts of the monitoring software, such as an analyzer and a facilitator developer, described further below.

The raw session file 12 in the form described above is then condensed or aggregated as shown schematically in FIG. 4 by a unit referred to in the following as a condenser 16 into a processed or condensed session file 18.

The raw session file 12 is maintained for the duration of a session, being initialised to an empty state at the start of a session, and is a complete record of user activities that have generated application software codes 8 present in the code master profile 15.

Returning to the example in which a part of the true codes segment of the raw session file 12 is as follows:

<gm><t><1><180>
<gmm><t><l><30>
<gm><t><1><5>
<gmm><t><l><40> the processing of the raw session file 12 by a unit of the monitoring system 5 which we shall refer to in the following as the condenser 16 is considered.

The condenser 16 aggregates like user activity codes making use of the count field. Pursuing the example, the session file output by the converter 10 after processing by the raw session file condenser could be:

<gm><t><2><185>
<gmm><t><2><70>

The condenser 16 acts on the raw session file 12 at intervals determined by a further unit of the monitoring software referred to as a coordinator 30, which monitors write activity of the input code processor 11 to the raw session file 12 via a communication line 35.

The coordinator 30 may for example be configured to trigger the condenser 16 to process the raw session file 12 via control line 33 when the latter reaches a predetermined size. The coordinator may interrupt the running of the application software 3 via control line 32 to allow the converter 10 to process the raw session file 12. The coordinator 30, which monitors the activity frequency by monitoring write activity into the raw session file 12 via communication line 35, may alternatively be configured to trigger the condenser 16 when activity levels are lower than a predetermined threshold level, thus indicating that the computer is not currently intensively occupied with application software functions. Moreover, the coordinator 30 may be configured to trigger the condenser 16 with a variable threshold. For example, the threshold could be set initially to trigger condenser processing on the addition of each new line to the raw session file 12 when a user unknown to the system uses the application software for the first time and is thereafter varied so that processing occurs less and less frequently as the system builds up a profile of the user concerned (see below). The coordinator thus also acts according to the current contents of the raw session file 12 which it can read via communication line 37.

The coordinator 30 thus regulates the condenser 16 to ensure that the condenser 16 processing does not unnecessarily slow the application software 3. The coordinator 30 has the general role within the monitoring software of controlling the timing of all monitoring software activities, apart from the converter input which is in real time, to limit the slowing effect of the monitoring software 5 on the application software 3.

The coordinator 30 not only controls the condensing of the raw session file 12 but also performs initial control of the application software on the basis of an analysis of the raw session file 12. In the example we are following, namely a raw session file of:

<gm><t><1><180>
<gmm><t><1><30>
<gm><t><1><5>
<gmm><t><1><40> the coordinator 30 may determine that the user needs help, owing to the frequency of 'gm:t' code generation, and issue a control signal to cause the application software to generate a help message from its own help system. The user may then for example select to go to (g) the health and safety section (hs) in the application software. If this sequence of events takes place, the extra codes generated as a result of the coordinator 30 intervention will also be picked up from the operating system memory locations or from the bus by the converter input in the same way as any other code pairs, and thus ultimately find their way into the session file. The condensed session file 18 generated by the converter 10 could then be as follows:

<gm><t><2><185>
<gmm><t><2><70>
<h><t><1><0>
<ghs><t><1><34> indicating that help (h) has been invoked once and that the activity "goto health and safety section" (ghs) was generated.

Help may be in one of two modes referred to in the following as tutored and untutored help. Untutored help provides a one-shot intervention by the coordinator 30 to generate a single help code for the application software's help system. Tutored help provides a multiple-step intervention. For example, if tutored help is selected, a routine of the coordinator 30 can determine an optimum path in the application software optimized in terms of the help it will provide in overcoming whatever difficulty the monitoring system 5 believes the user to have. The optimum path calculated by the tutored help routine is calculated with reference to a progression route master profile (discussed further below) and is stored in an optimum path file as a sequence of codes in a similar record structure to that of the raw session file 12. The stored optimum path file can then be used to guide the user to follow the optimum path step by step with further help being invoked if deviation from the optimum path is detected.

The lines of the false codes segment of the raw session file 12 are condensed in a similar manner to those of the true code segment with the exception that by definition for the false codes there is no activity code match in the code master profile 15. The condenser 16 thus aggregates like application codes with false activity fields only to the extent that they also have the same activity codes. The condenser routine for the false codes thus has additionally a false code allocator which allocates false codes <f1>,<f2> etc. to the first, second etc. like pairs of application and user activity codes. There may thus for example be a plurality of <fn>codes associated with <gp><f> codes in the raw session file 12, one for each user activity code paired with a <gp> code.

On occurrence of a predetermined number, such as 2, of consecutive 'false' codes the coordinator 30 may be configured to initiate the help system of the application software, but the user may cancel the help prompt if he is deliberately performing a sequence of activities and does not wish to be interrupted. The coordinator 30 could then be configured not to generate further help prompts until the next record with a true-code occurs in the raw session file 12.

The coordinator 30 may also be configured to perform other tasks to enhance the integrity of the data in the condensed session file 18.

From the above it will thus be appreciated that the converter processes paired input codes to generate a raw session file 12 in real time by means of accessing a code master profile 15 for the application software and then processes the raw session file 12 into a condensed form under the control of the coordinator 30. The converter 10 thus allows a history of relevant information about a user's use of the application software to be built up in a manner designed to minimize the amount of computing time taken away from the application software during its periods of intensive activity.

The condensed session file 18 generated by the converter constitutes source data for input into a further unit of the monitoring software referred to as a compressor 20. The compressor 20 analyses the session file with reference to a progression route master profile 22 for defining envisaged progression routes through the application software and an existing stored activity profile 24 of the user (if available) and, on that basis, writes to the existing, or a new, user activity profile 24. It is only after this stage that the stored data becomes absolute.

This process is now described in more detail with reference to FIG. 6 which shows the flow through the compressor 20.

The compressor routine acts linewise on the session file 18 created by the converter 10, comparing each recorded line against the progression route master profile 22. A record of the master profile for progression routes is as follows:

<output code><activity(t/f)><section><page><block no.>.

Thus a part of the file looks like:

|    |   | Section | Page | Block |     |
|----|---|---------|------|-------|-----|
| pm | t | 1       | 1    | 1     |     |
| pm | t | 1       | 2    | 2     |     |
| pm | t | 1       | 3    | 3     |     |
| .  | . | .       | .    | .     |     |
| .  | . | .       | .    | .     |     |
| .  | . | .       | .    | .     |     |
| pm | t | 1       | 10   | 10    |     |
| pm | t | 1       | 11   | 11    | etc.| in which 'pm' represents 'materials page', the third and fourth fields or columns of each record indicate section and page numbers within the topic of 'materials', and the last field column gives a block number. Each block number is a number indicating the position in a predefined sequence of the activity within the section concerned, each section being defined as a subgroup of the topic for which an envisaged progression route is linear and thus definable by a sequence of block numbers. The system thus can recognize one or a plurality of envisaged activity sequences at section level and above so that multiple envisaged paths can be taken account of. The above example of a file is however a simple sequential list with a one-to-one correspondence between page and block numbers.

At this stage, the compressor 20 processes the contents of each line taken from the condensed session file 18 by adding the section and page, i.e. to convert from incremental to absolution position. With this new data, access can be had to the corresponding record of the progression route master profile 22 to obtain the corresponding block number.

As well as adding the block number for the line concerned, the processing routine also obtains from the progression route master profile 22 the block number of the page of the next expected event in the envisaged sequence ("next activity"). A true/false comparison is then be made between the current block number in the line being processed and the expected block number in the previously processed line, thus reducing the number of accesses to the progression route master profile 22. A false result indicates a non-envisaged progression route as defined by the block sequences in the progression route master profile 22 and thus represents a higher order contextual test than that performed by the converter 10 with reference to the code master profile 15.

Figure 6:
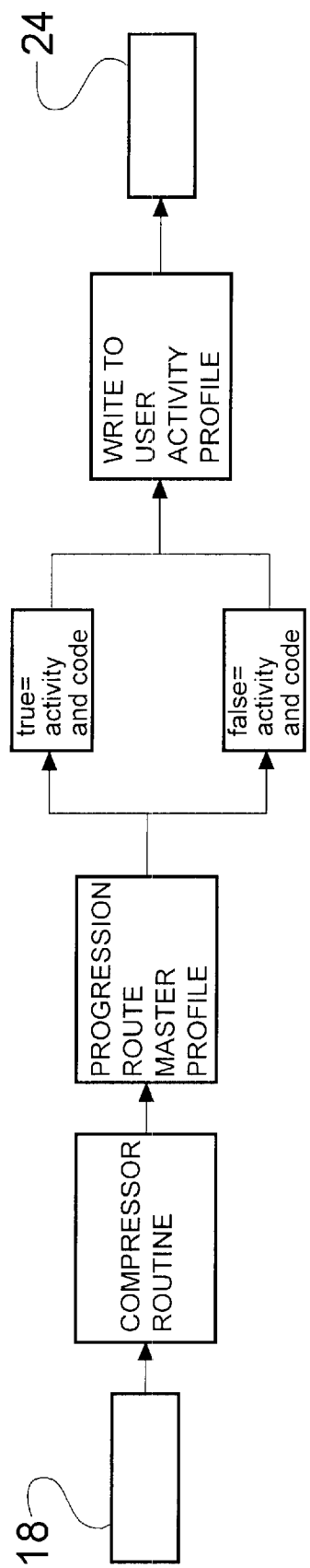
FIG. 6 is a schematic diagram of the flow through the compressor of FIG. 4.

At the end of the flow shown in FIG. 6, a line is written to or updated in the user activity profile 24. This involves updating the "number of times" information in the user activity profile 24 in respect of the current session, the "no. of times" field being a log similar to the <count> field in the condensed session file 18, but taking into account generations of this code in all previous sessions for the user concerned.

After processing by the compressor 20, a line of the user activity profile 24 relating to the code goto materials <gm> could for example thus be as follows:

gm:t:3:1:2:o:6:30:7:8 with a record format:
   <output code><activity(t/f)><section><current count (o)ld/(n)ew><total count><block number><next expected block number><time>.

This indicates that the user had in previous sessions looked at 'materials' section 3, page 1 four times and twice in the current session. The last two numbers being the block number of materials 3.1 and the block number expected for the next activity. On the other hand, if the user had in previous sessions not before looked at materials 3.1 then the line of the user activity profile 24 concerned could be:

gm:t:3:1:2:n:2:30:7:8

A new user activity profile 24 is generated when a user uses the application software for the first time and is updated on each session, being stored as a file 24, for example on disk, between sessions.

The user activity profile 24 thus contains lines of absolute data by which it is meant that the precise location and operation in the tree structure of FIG. 3 is contained in each individual line of the user activity profile 24. By contrast the session file data is incremental by which it is meant that the data is stored in a contextual or historical fashion and it is not generally possible to ascertain the location and operation in the tree structure of FIG. 3 from an individual line or record of the session files 12 and 18.

The coordinator 30, in its capacity as monitoring software coordinator 30, ensures that the session file is fully processed by the converter 10, by itself and by the compressor 20 at the latest at the end of each session, so that the user session files 12 and 18 do not need to be stored beyond the end of the user session concerned.

As in the case of the converter 10, the compressor 20 has a built-in fail-safe to filter out unrecognised codes by identifying them and then amending the compressor record count value to ensure no write operation is performed to the user activity profile 24 for that line of the condensed session file 18. For example, if the code "gm:t:3:1" present in the condensed session file were not present in the progression route master profile 22 then an internal compressor code "an:f" analogous to Example 2 described above with reference to the converter 10 would be generated and that line of the condensed session file 18 would not result in any updating of the user activity profile 24. Such a situation could for example arise if the topic of materials had been revised in the course of an upgrade to remove materials section 3 and the progression route master profile 22 had not been correspondingly modified.

The user activity profile 24 also contains a logical element for each topic, section and page indicating whether the topic, section or page concerned has been accessed by the user 4, this being described with reference to user competence assessment performed by a comparator unit 40 of the monitoring system 5 which is to be described further below.

The user activity profile 24 can serve as source data for further higher order components of the monitoring system 5 to act upon and ultimately allow reconfiguration of the application software 3, either automatically within the framework of the monitoring system 5, or by providing output to a system supervisor in a form amenable to expert interpretation. For example, the logging of the 'false' activity relating to recognised application software codes 8 in the user activity profiles 24 can allow the progression route master profile 22 to be reconfigured, either automatically by the monitoring system 5 or with the aid of manual intervention, e.g. in our specific example by a training course supervisor.

Figure 7:
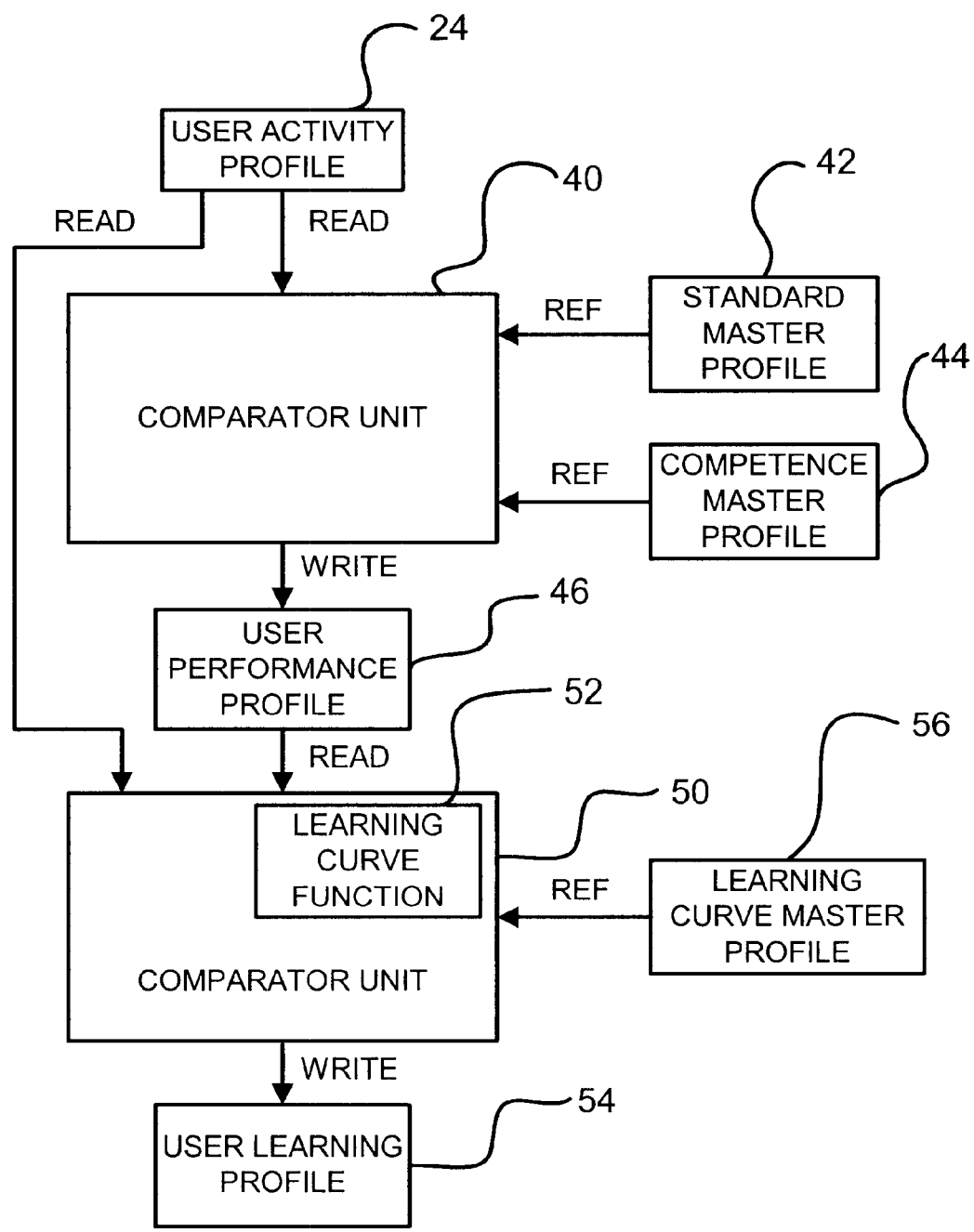
FIG. 7 is a schematic diagram of a comparator and assessor of the first embodiment.

The first higher order functional unit to be described that uses the user activity profile 24 as source data is the activity profile comparator 40 shown schematically in FIG. 7.

The comparator 40 calculates whether standards and competence levels have been met by a user by analyzing a user's activity profile 24 with reference to a standards master profile 42 and a competence master profile 44 respectively, these master profiles being set up specifically for the application software 3 under control.

The standards master profile may for example specify that a certain code, such as a "gm:t:3:1" code, should not be generated more than a certain number of times prior to completion of materials section 3. If for example the user activity profile 24 contains the code "gm:t:3:1:2:o:6 . . . " etc. indicating that "gm:t:3:1" has been created six times in total by the user, i.e. the user has called up page 3.1 of the 'materials' section six times, and if the maximum generation number specified in the standards master profile 42 for "gm:t:3:1" is six, then, when the "number of times" element in the code equals six, the comparator 40 is triggered to assess whether the standard has been met for section 3 of the topic 'materials'. If the standard is judged to have been met with reference to the standards master profile 42, then it is judged with reference to the competence master profile 44 whether the competence level has been met for section 3 of the topic 'materials'. The standard assessment thus provides a judgemental value of activity against a defined standard. In the example, if the maximum generation number is 5 and the number of times of access is 6, then the standards value may be 6/5 or +20%.

By contrast competence is purely descriptive of whether an activity has been performed, i.e. a competence field in the record of the user activity profile 24 associated with each activity will merely indicate <done/not done>.

Therefore, to meet the competence criteria relating to a section it may for example be necessary that the user has visited all the pages in that section, whereas to meet the standard relating to a section it may for example be necessary that the user has visited those pages in an envisaged sequence and within a maximum number of visits to that section.

The definition of standards and competence is thus axiomatic and defined by the content of the respective master profiles for competence and standards such that standards relating to an aspect of the process cannot be met until competence has been demonstrated for that aspect.

When the standard and competence level of section 3 of 'materials' are judged to have been met by the comparator 40, the individual page codes relating to section 3, e.g. "gm:t:3:1, gm:t:3:2 . . . gm:t:3:8" are reduced to a single section code with a done=true logical element, e.g. "gm:t:3d", where "d" indicates done. Similarly when all the sections in a topic are satisfactorily completed, as judged by the comparator 40, the section codes are reduced to a single topic code with a done=true logical element. Parameters relating to the standard and competence level of the user made by the comparator 40 during the current session are then written to a user performance profile 46, whether or not the standard and competence level is judged to have been met.

The user performance profile 46 generated or updated by the comparator 40 is then used as source data by an assessor 50. The assessor 50 processes the data held in the user performance profile 46 using a master learning curve profile for the application software under control. The assessor 50 has one or more functions which it can apply, each function generally having a plurality of dependent variables or arguments, which are parameters stored in the user performance profile 46 or other ones of the user profiles, such as the user activity profile 24, or parameters calculated from the stored values.

For example, a function may use an aggregate divergence value for a completed section as an argument. Assuming for example that the envisaged block sequence of gpt4-codes is linear from 1 to 12, a divergence value could be calculated from the actual block sequence of gpt4-codes listed in the lines of the user activity profile 24. For example if the block sequence of gpt4-codes recorded in the user activity profile is "1, 2, 3, 6, 7, 8, 5, 4, 9, 10, 11, 12", then the corresponding divergence value would be the sum: 0+0+0+2+2+2+2+4+ 0+0+0=12. This value could then serve as an argument for a learning curve function 52 and/or be a parameter deemed to be useful in itself and thus to be written directly to the user performance record. The variables deduced by the learning curve functions 52 are then written to a user learning profile 54.

The comparator 40 thus stores parameters which relate to standards and competence levels in a user performance profile 46 and the assessor 50 then deduces compound parameters using the learning curve functions 52 of the assessor 50 and the learning curve master profile 56 and writes the deduced parameters to a user learning profile 54. The user learning profile 54 can thus provide a record of how fast and how well the user is learning and, for example, of fluctuations in the user's learning process, which may be indicative of the user encountering problems with particular topics or linked pages of different topics, such as pages of otherwise unrelated topics having a maths content.

Figure 8:
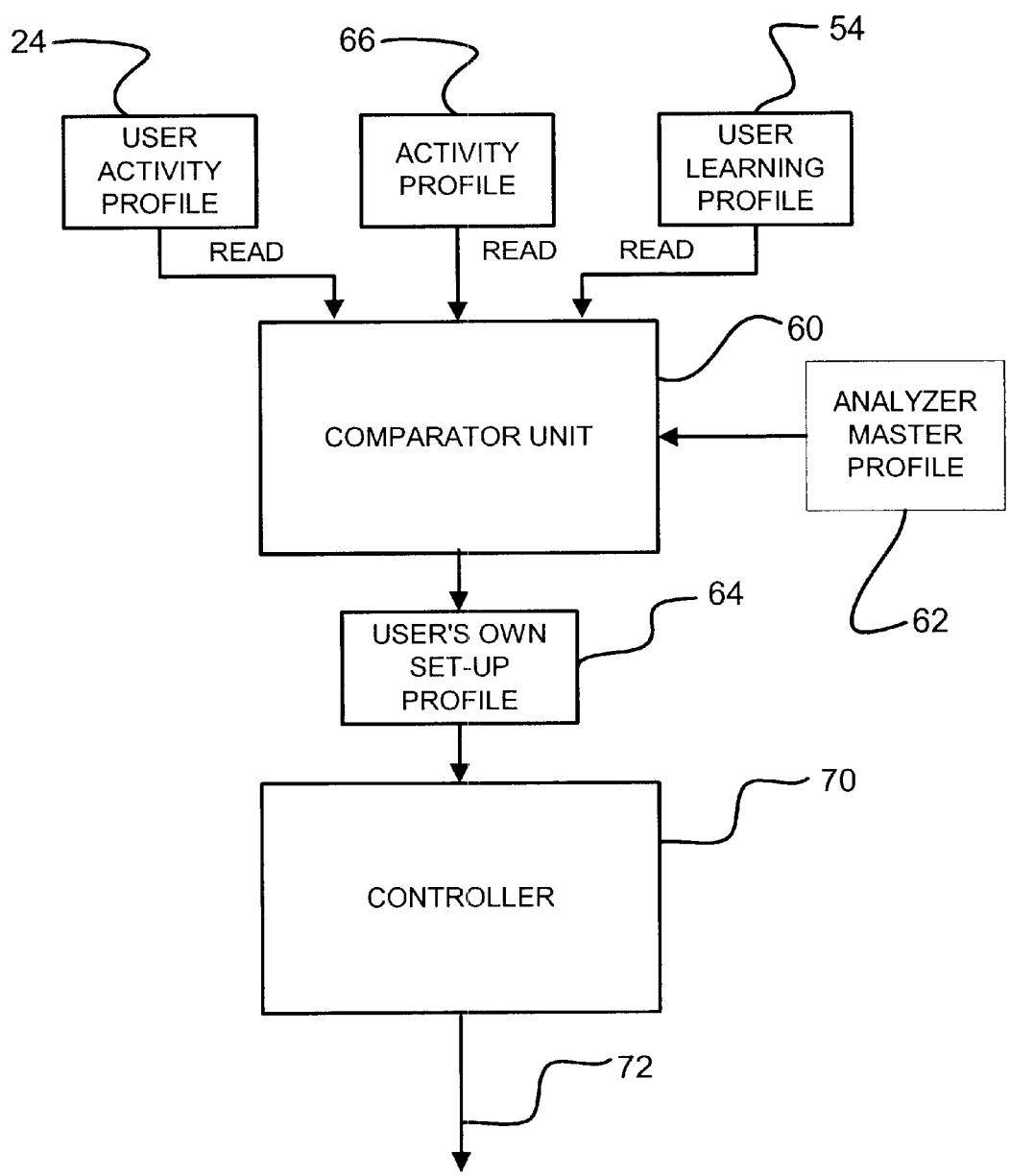
FIG. 8 is a schematic diagram of an analyzer and controller of the first embodiment.

FIG. 8 is a schematic diagram of an analyzer 60 and a controller 70 of the monitoring software of the first embodiment. The analyzer 60 analyses the user activity profile 24, the user learning profile 54, and other one or ones of activity profiles 66 which may exist in the monitoring system, with reference to an analyzer master profile 62 and writes to a user specific application software set-up profile 64.

The controller 70 then modifies the application software set-up according to the user's own set-up profile 64, so that the running of the application software is tailored to the user concerned on the basis of the analysis of the user's past interaction with the application software. The controller 70 also intervenes directly in the running of the application software if the analyzer 60 has judged this is desirable on the basis of its analysis of the user's current behaviour.

For example, if the activity type in the user activity profile 24 is false for the section in which the user is currently working, then the analyzer 60 may write to the application software profile a code such as goto turning tool true (gTtt) which will then be acted upon by the controller 70 by intervening to ask the user if he wishes to goto the turning section. In this instance, the analyzer's decision to write a gTtt-code to the application software profile may have been deduced as a result of the analysis revealing that the user, who is currently in a section which assumes prior knowledge of turning, has made a number of wrong decisions regarding turning in that section. The analyzer 60 may then be prompted by this deficiency to access the user performance profile 46 and establish therefrom that the user has not yet met the standard in the turning section.

Figure 9:
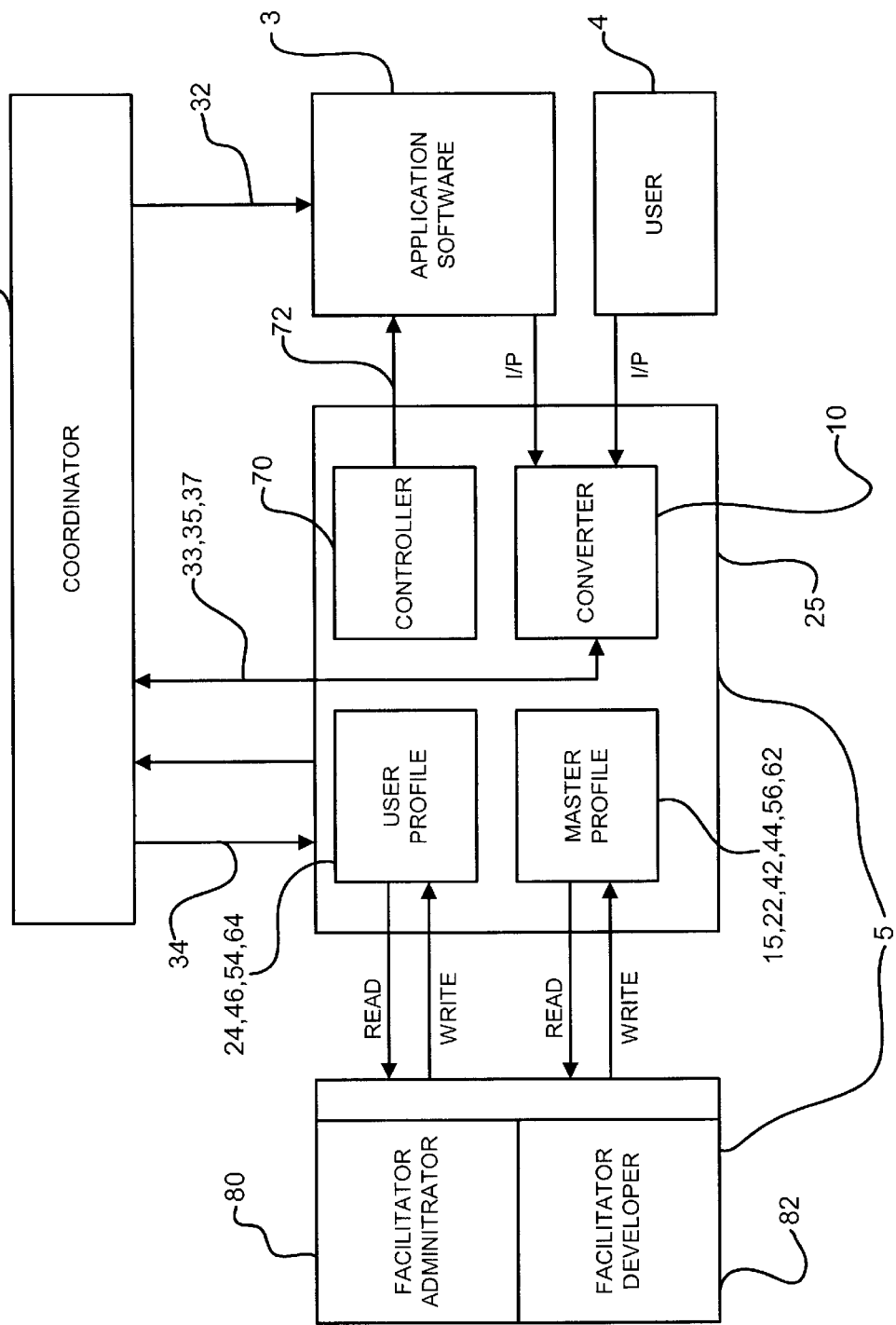
FIG. 9 is a schematic diagram of the components of the monitoring system of the first embodiment together with the application software and user input device(s)

FIG. 9 is a schematic diagram of the whole monitoring software of the first embodiment, together with the application software and user input device or devices.

The functional units of converter 10, compressor 20, comparator 40, assessor 50, analyzer 60 and controller 70, are shown grouped together as a facilitator functional unit 25 to reflect their collective function of facilitating the interaction between the user and the application software on the basis of user profiles, the feedback between user behaviour and the application software being implemented primarily by the controller 70.

There is also a monitor unit of the facilitator 25 which tracks the processing of the facilitator input, entered via the converter 10, through the compressor 20 and then through the higher order facilitator units of comparator 40, assessor 50, analyzer 60 and controller 70. If the system crashes or is abruptly shut down, the monitor is able to complete the processing of semi-processed data from elements in the stored records of the user profiles and the session file which indicate the process state of the data lines concerned.

In FIG. 9, the coordinator 30 is shown separately in a manner that reflects its function of coordinating the activity of the monitoring software in relation to the application software.

Also shown in FIG. 9 are facilitator developer and administrator functional units 82 and 80 which have not hitherto been mentioned but which are now described. The facilitator developer 82 and administrator 80 are for modifying the group of master profiles 15, 22, 42, 44 and 56 relating to the application software 3 concerned. The facilitator developer 82 and administrator 80 are thus primarily although not exclusively concerned with generic, rather than user-specific, enhancement of the interaction between the users and the application software 3 concerned. The difference between the facilitator developer 82 and administrator 80 is that the developer provides for automatic modification of the master profiles, whereas the administrator 80 provides for modification of the master profiles by the system supervisor.

Tools are provided for use by the facilitator developer and administrator 82 and 80 for analyzing the behaviour of all the users, groups of users, or individual users on the basis of the user profiles 24, 46, 54, 66.

The false codes <gm><f>etc. and <fn>described above with reference to converter and compressor operation respectively can now be analyzed.

For example, a false code sequence <gm><f> etc. identified at the converter level may be indicative of a problem with the progression route master profile 22, since it may be due to the fact that the code master profile 15 has been upgraded to include new application codes relating to a new application software version, but the progression route master profile 22 may not have been upgraded correspondingly.

For example, a false code sequence <fn> identified at the compressor level may be judged by the system supervisor to be an acceptable alternative progression route to the already envisaged route or routes. A corresponding new route or path may be then added to the progression route master profile 22. Alternatively, the same modification to the progression route master profile 22 could be achieved automatically by the facilitator developer 82. For example, if a number of users follow the same false code sequences and the facilitator developer 82 judges all users who have generated this false code sequence to be generally proficient on the basis of their user profiles, then the developer 82 can decide on that basis to add the corresponding new path to the progression route master profile 22 and perhaps to also draw the system supervisor's attention to the fact that this modification has been made.

If the development of the facilitator by the developer or administrator involve changing the record structure of one or more of the master profiles, for example by adding new fields, means can be provided for automatically upgrading the records in the user activity profiles 24, 46, 54 etc.

Figure 10:
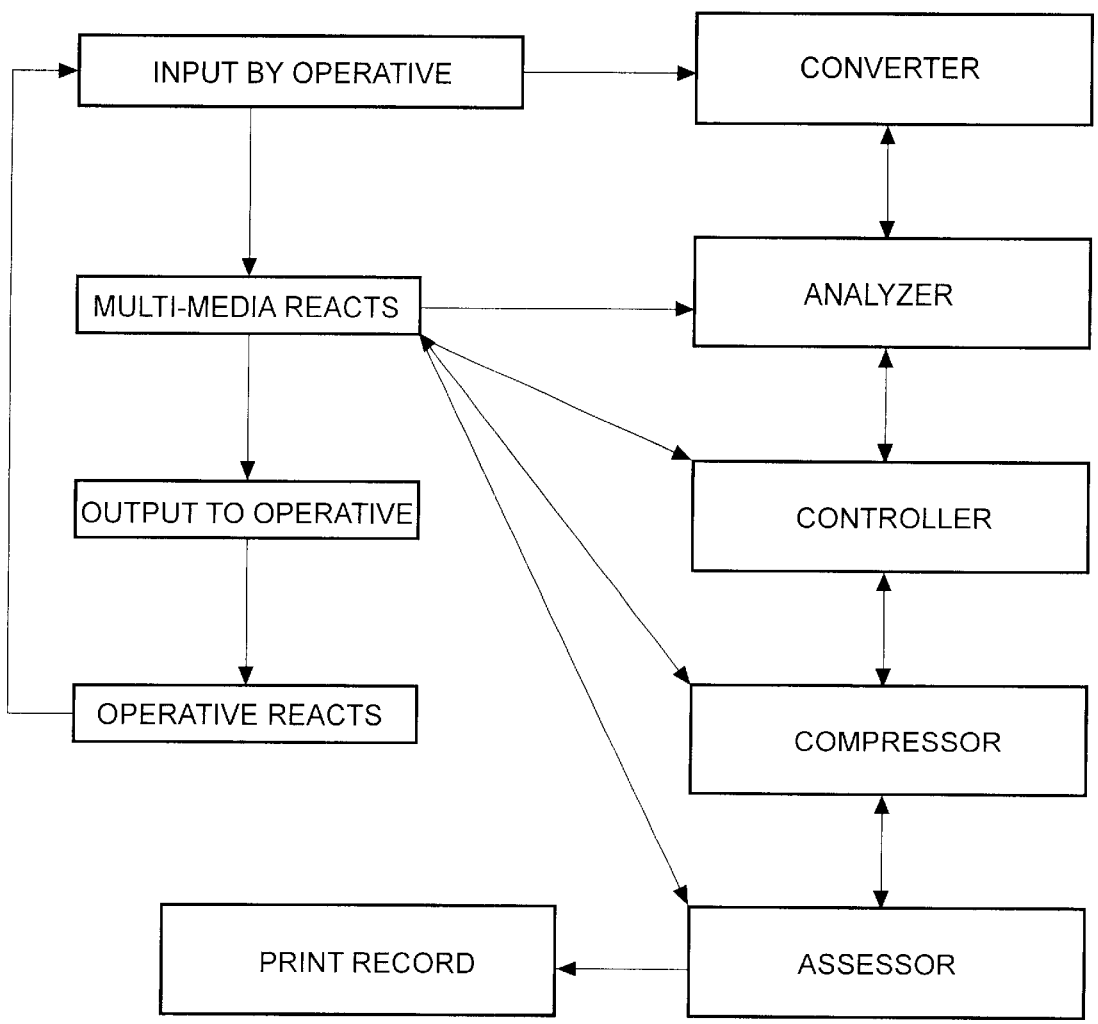
FIG. 10 is a schematic diagram showing the operational links between the components of a monitoring system of a multimedia training system used as a specific example of the first embodiment.

FIG. 10 summarises the operational links between the above-discussed components of the monitoring system 5 of a multimedia training system of the first embodiment. The application software and user input is shown on the left-hand side of the figure and the various facilitator units on the right-hand side of the figure. Facilitator administrator and developer units 82 and 80 are not shown.

As can be seen from FIG. 10, the multimedia application software reacts in a manner affected by the controller 70, compressor 20 and assessor 50, with the assessor 50 also providing a print record, for example for a course supervisor in the example of multimedia training software.

Figure 11:
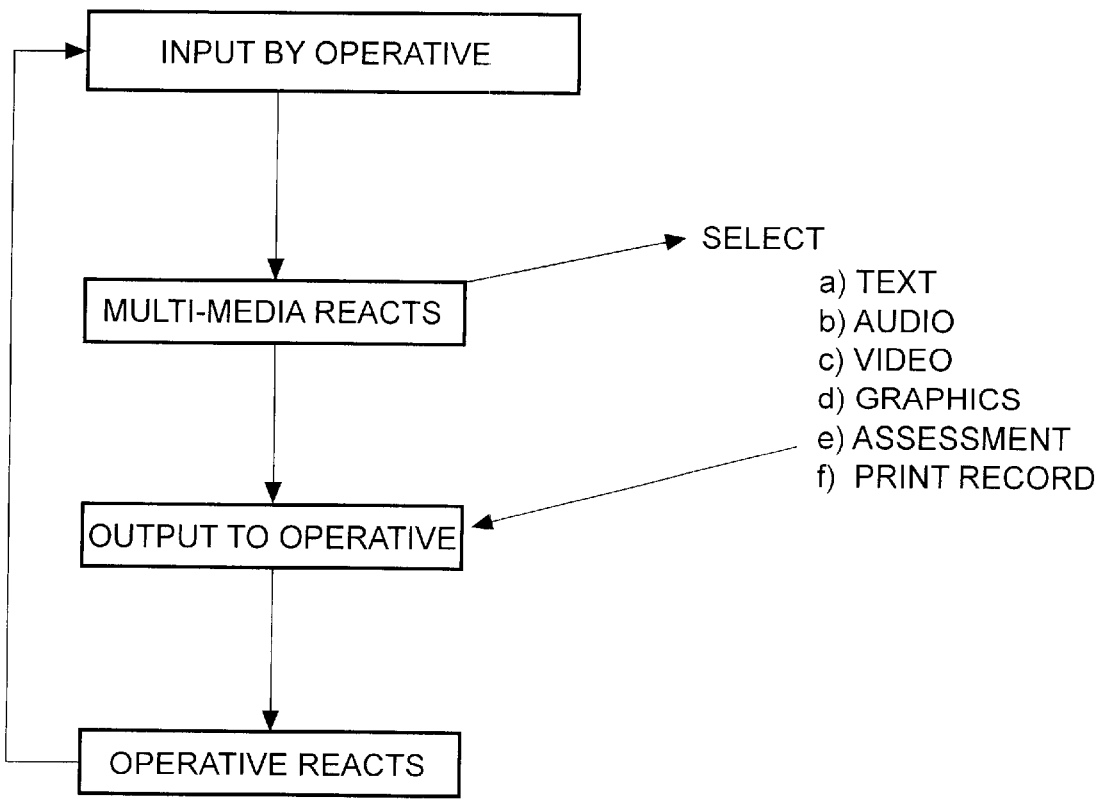
FIG. 11 is a schematic diagram showing the operational links between the components of a prior art multimedia training system for comparison with FIG. 10.

By contrast, FIG. 11 shows the situation in a conventional multimedia application software package.

Figure 12:
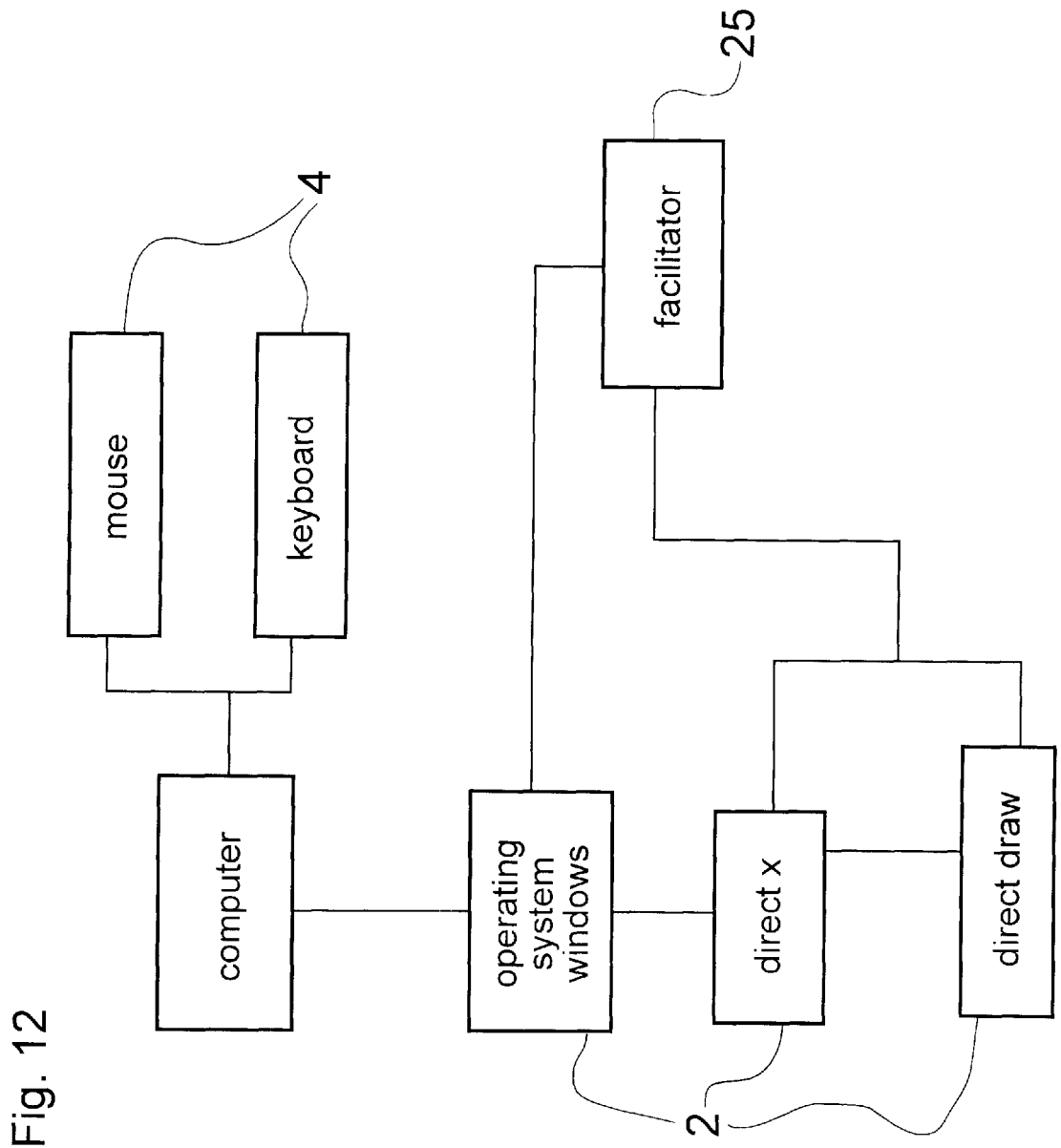
FIG. 12 is a schematic diagram of an example of the first embodiment in which a 3D simulation of a lathe is provided.

FIG. 12 shows a schematic diagram of a 3-D simulation of a lathe which may be provided as a stand alone application or as part of the multimedia training system described with reference to the first embodiment. The application software can run from a CD-ROM on a personal computer using the operating system Windows 95. Windows 95 includes "direct x" and "direct draw" functions relating to graphics manipulation. The operation of the lathe simulated on the screen in real time in 3-D and is controlled by the user via a mouse and keyboard. Using the direct x and direct draw facilities of Windows 95 a multilayer 3D image of a lathe is created in real time and separate controls for each relevant moving part such as the cross-slide, saddle and tailstock are provided. Using the converter 10, there is either a control which is an object or control bar and window. Each control generates an individual code. For example a cross-slide code may be identified together with a directional code for clockwise or anticlockwise movement of the cross-slide. The user may have the facility of "turning" on the graphical image of the dial on the displayed control panel so that the cross-slide of the lathe moves and stops as the dial is turned. At this point, any direction changed in X and Y coordinates is recorded at the end point. These X and Y coordinates and the control code are then processed within the facilitator. Similar considerations can apply for the saddle and tail stock controls.

The next step could then be the placing of cutting tools within the lathe and selection of the material to machine, this being performed outside the 3D environment. With the knowledge of the material selection and the tool selection, the 3D simulation can then allow the user to machine the selected material with the selected tool in real time on the screen under control of the monitoring system 5 comprising facilitator and coordinator 30 as shown in FIG. 9.

Figure 13:
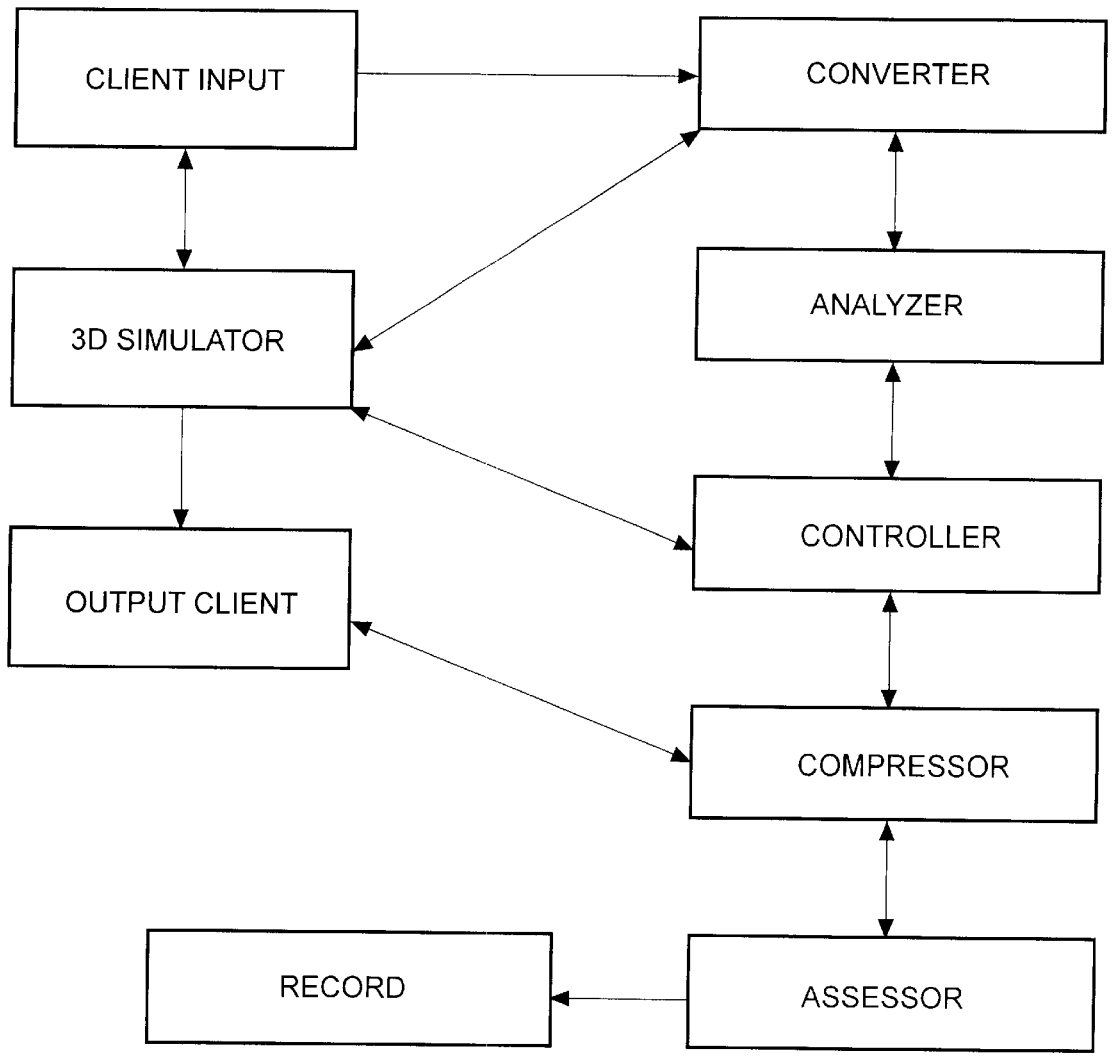
FIG. 13 is a schematic diagram showing the operational links between the components of a control system of a 3D simulator, such as the lathe simulator of FIG. 12.

The operational links between the components of a control system of 3D simulators, such as that described with reference to FIG. 12, are shown in FIG. 13.

It is noted that although CD-ROM is given as the medium for the application software, other storage media may also be used.

Having now completed the description of the first embodiment it will now be appreciated that a facilitator, optionally with associated facilitator developer/administrator, can be used to monitor and optionally control an operating system 2 and its interaction with the computer hardware 1 as shown in FIG. 2 of the second embodiment. The two monitoring systems 5 of FIG. 1 and 2 may be provided in the same computer system. They may operate independently of each other or they may be linked, for example by sharing a common facilitator developer and administrator unit.

Figure 14:
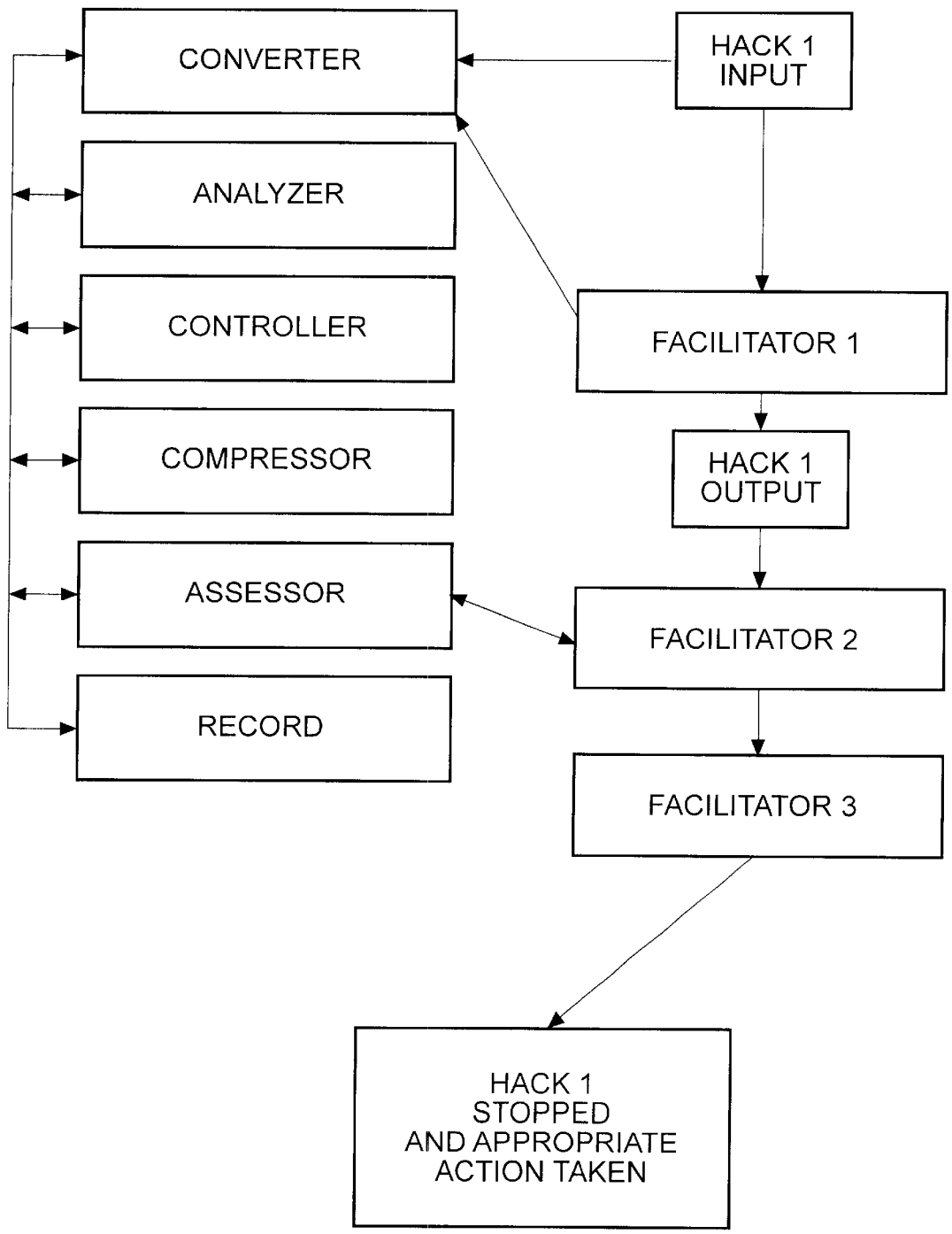
FIG. 14 is a schematic diagram showing the operational links between the components of a monitoring system 5 for providing data security, e.g. a system for banking transaction machines such as cash dispensers.

A further application of the monitoring system is shown in FIG. 14 which shows the operational links between the components of a system for providing data security such as a system for monitoring bank transaction machines such as cash dispensers. This application shows a multilayered facilitator with a second facilitator monitoring the output from a first facilitator to thus provide a multilayered security barrier or "fire wall" against hacking. In use, user profiles are built up for individual card users and these are then used to assess whether a given card usage is typical or atypical of the user concerned. In the event of atypical behaviour, an alarm can be triggered and appropriate action taken. The user profiles may relate to data such as the frequency with which the user forgets his personal identification number and/or the spending patterns of the user having regard to past incomings and outgoings and credit limits etc.

Figure 15:
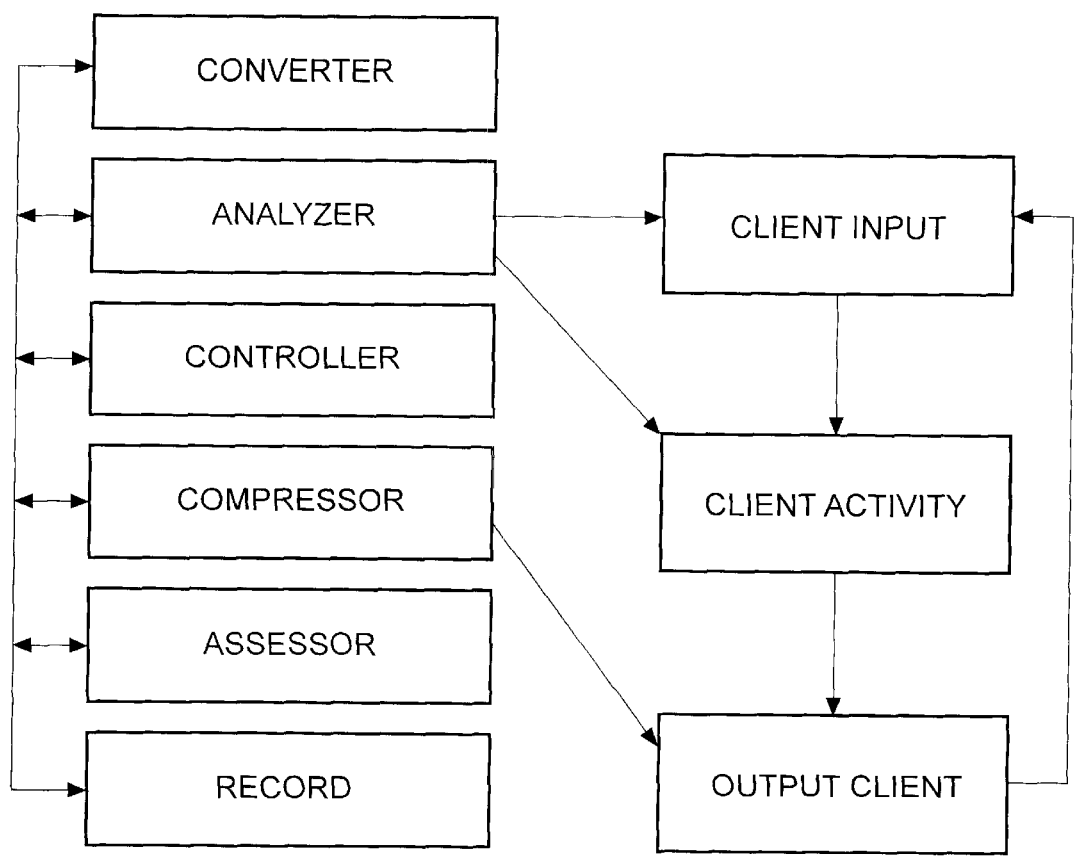
FIG. 15 is a schematic diagram showing the operational links between the components of a control system for controlling a help system of a computer program.
Figure 16:
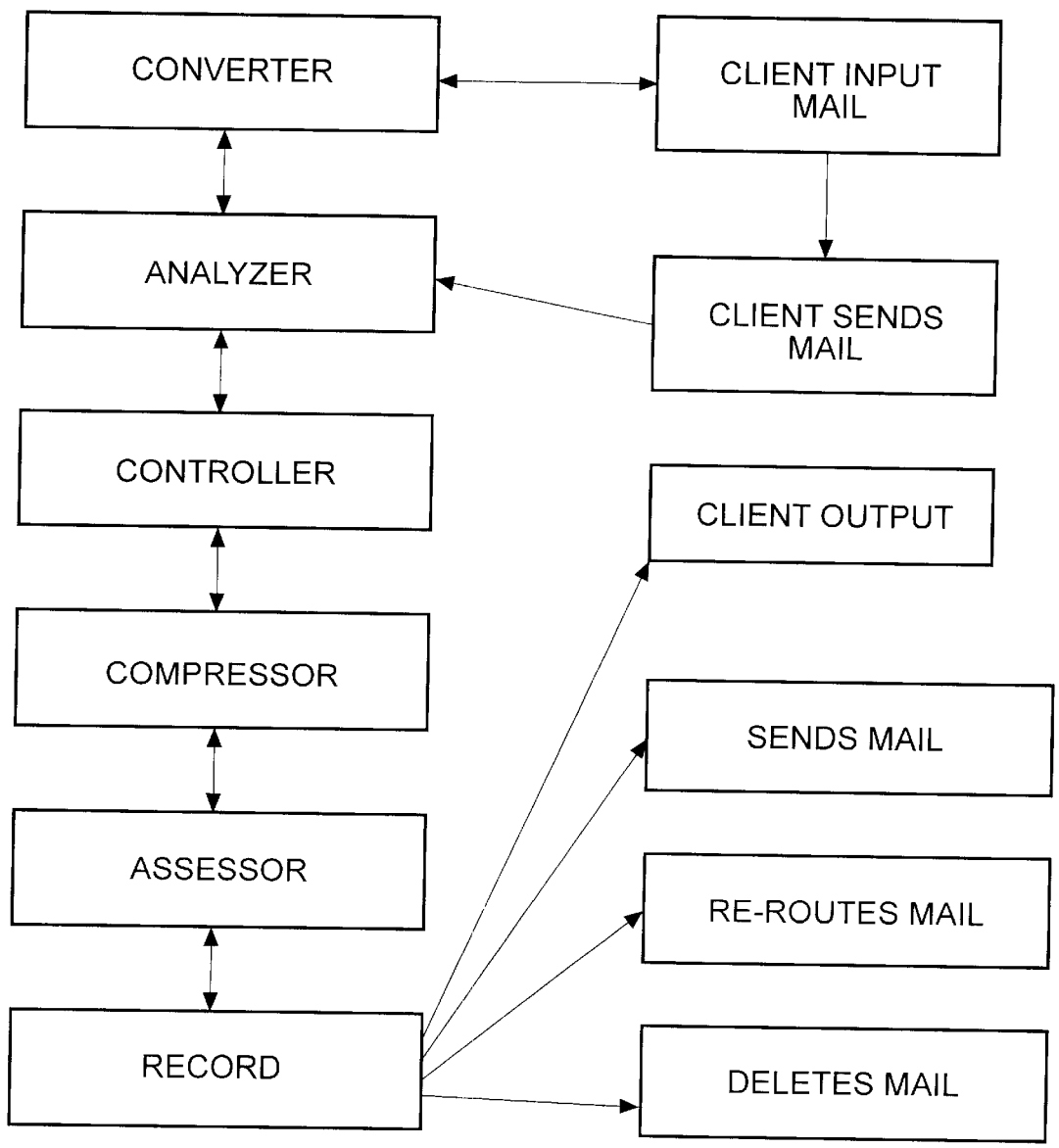
FIG. 16 is a schematic diagram showing the operational links between the components of a control system for controlling an electronic mail system on a network.
Figure 17:
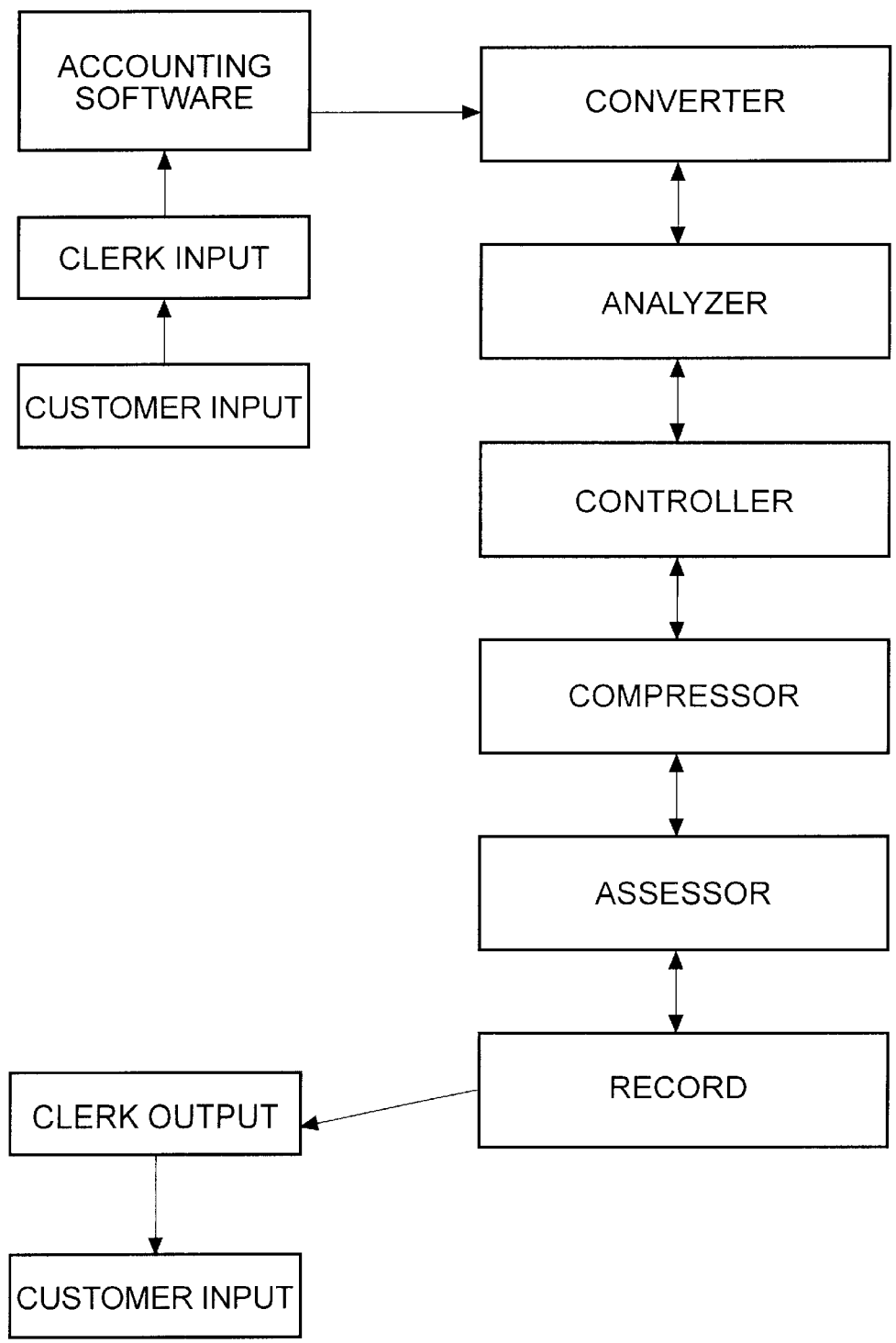
FIG. 17 is a schematic diagram showing the operational links between the components of a monitoring system 5 for monitoring the processing by bank clerks of customer transactions.

FIGS. 15 to 17 show further applications of the control system for controlling a help system, for controlling electronic mail distribution and for monitoring a bank clerk performing the processing of customer transactions in a computerised transaction system.

Figure 18:
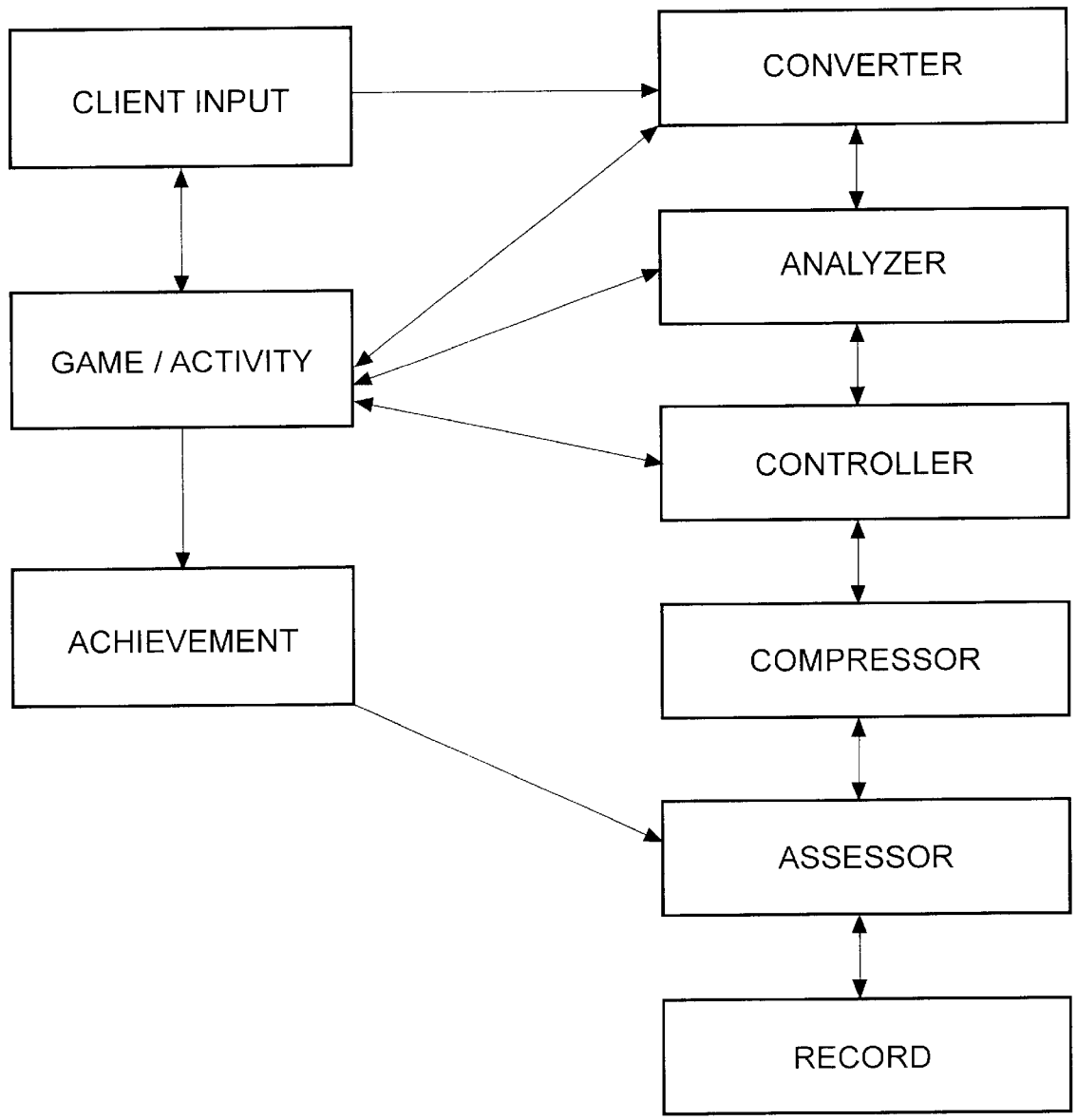
FIG. 18 is a schematic diagram showing the operational links between the components of a control system for controlling product marketing.

FIG. 18 shows a marketing application. In this application, marketing can be facilitated by taking for example a product such as toothpaste. Data can be gathered by generating an activity and facilitating this. The activities may for example be the designing of a receptacle that is user friendly and practical in use, the selection of the flavour which is preferred or the colour or colour combination found to be attractive. The monitoring system 5 monitors and/or measures the activity to achieve the objectives of the examples described above. The results would be the achievement, but the most important issue would be (1) how, (2) why and (3) the process by which choices were made. Moreover, the application must be done in such a way that the candidate is unaware of the analysis that has taken place and is taking place, giving the facilitated results in a discrete manner.

Therefore, in a first example, the result would be accomplished by selecting shapes that are preferred against the practicality of standards and performance criteria defined in the comparator 40. Shapes which fall outside the measured standards would be identified. The second example of relating to flavour selection can be achieved by creating menus of preferred purchase items and selecting next week's groceries etc. to give the preferred tastes and/or selected tastes. The third example of colour and colour combination can be executed by decorating a house and creating the best colour or colour combination to include showing the preferred contrasts. In all these examples, once the data has been collected it can be put within groups such as age, name, etc. relating to each participant.

Figure 19:
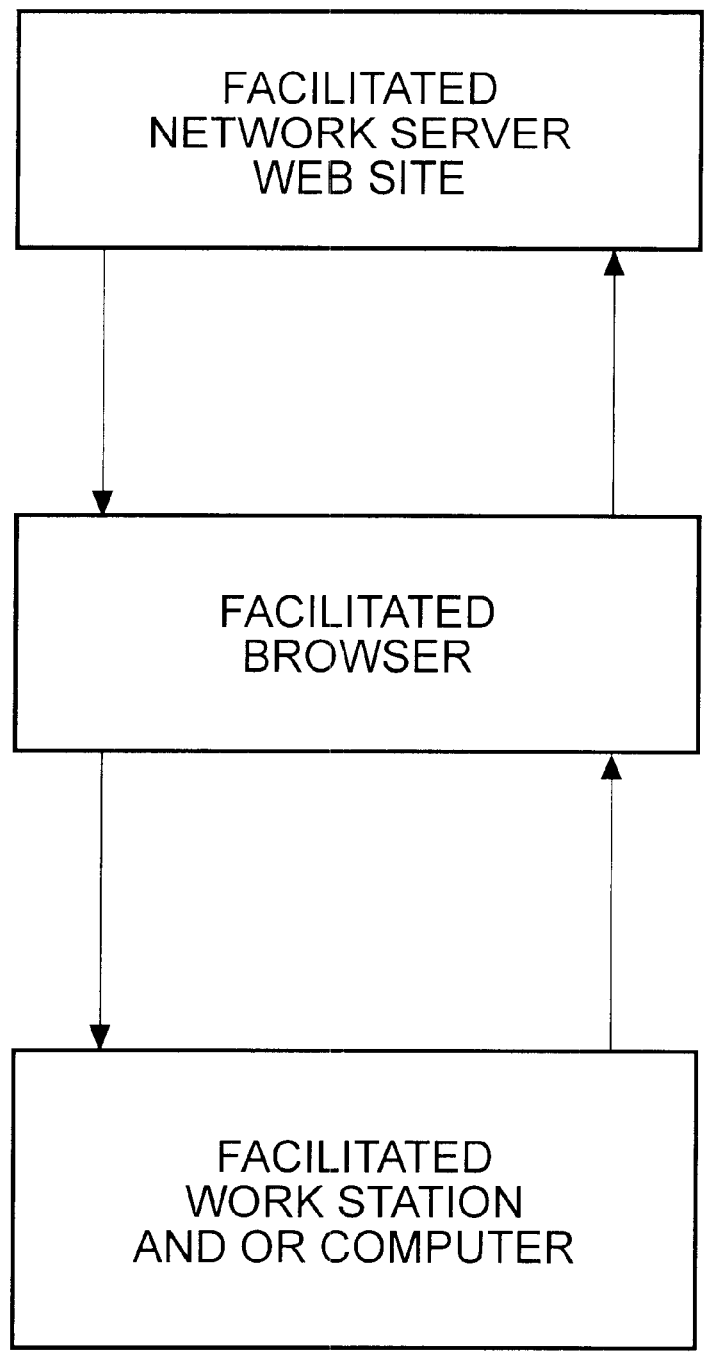
FIG. 19 is a schematic diagram showing the operational links between the components of a control system for controlling a web browser.

FIG. 19 shows a further application relating to a browser link to a network or server. The facilitator browser link to the network or server facilitates applications on the network or server. The browser can thus guide its user to make the most efficient use of the connection and will be able to facilitate performance on the activity as part of the facilitator functions. Moreover, the application situated on the network, server or web site will be able to facilitate the user and the browser facilitator. The importance of this is that the application facilitator can evolve faster and thus develop itself to a more sophisticated level due to the larger number of users performing activities on it and will thus be in a strong position to be able to determine an optimum mean path through the application.

A plugin can be used to change and tailor the characteristics of the facilitator and can provide numerous variations of applications. The plugin can for example be used to change via the facilitator developer 82 the sequences defined by the block numbers or even to modify the structure of the application as defined for the first embodiment in FIG. 3. With the additionality of plugins the compressor can become more sophisticated, both in terms of the progression route master profile and the compressor routines which may then include known pattern recognition routines. This is important for typical plugin applications, since, in contrast to the training software example of the first embodiment in which there are relatively few code variables, there will typically be a large number of variables for the compressor to handle.

Multilayering of browser and application facilitators is an especially preferred embodiment.

One example is a retention plugin and another is a personality plugin to give the measure of reactions of an application to given input information. Measured reaction shows likes, dislikes and preferences and generates a "preferred personality identified" result. Once facilitated, an approach tailored to the appropriate character can be selected.

A facilitated web site may also have a plugin that monitors the facilitated application and evolves with this, which in turn could evolve the applications' computers with facilitated software. A plugin could learn about the user and provide facilitated tasks, thus making and preparing documentation quicker and simpler, owing to the fact that the facilitated software would know what to expect the user to do next with each facilitated application.

With the retention plugin example, the data collected and collated from the standards and performance criteria, and also the learning curve, can be used to monitor activity which has been unlearnt, i.e. forgotten, where part or parts of the application have duplicate functions.

This can be reflected within the facilitated programs where an expected learnt function is active but the activity response is negative indicating that this activity has been unlearnt. The rate of this activity can be measured over a number of lessons and a "candidate profile of retention" can be generated and acted upon with the facilitator developer 82. Reasons for the forgetfulness of the user can be defined, as approached to the user concerned, and can be fed back by a control function for altering the frequency of help to be given or, in a worse case, by the facilitator developer 82 changing the presentation of an icon or graphical representation in an attempt to overcome the retention problem related to the unlearned activity. A graphic variable plugin may thus be provided so that the variable response to graphics can be changed, measured and/or monitored.

A compressor plugin can also be provided to monitor and control the process of operations of a web site, network or server giving the role to the facilitator of checking and compressing these activities at the web site, network or server. The activities could be facilitated with either a standard facilitator or with additional tailored plugin facilitators.

Figure 20:
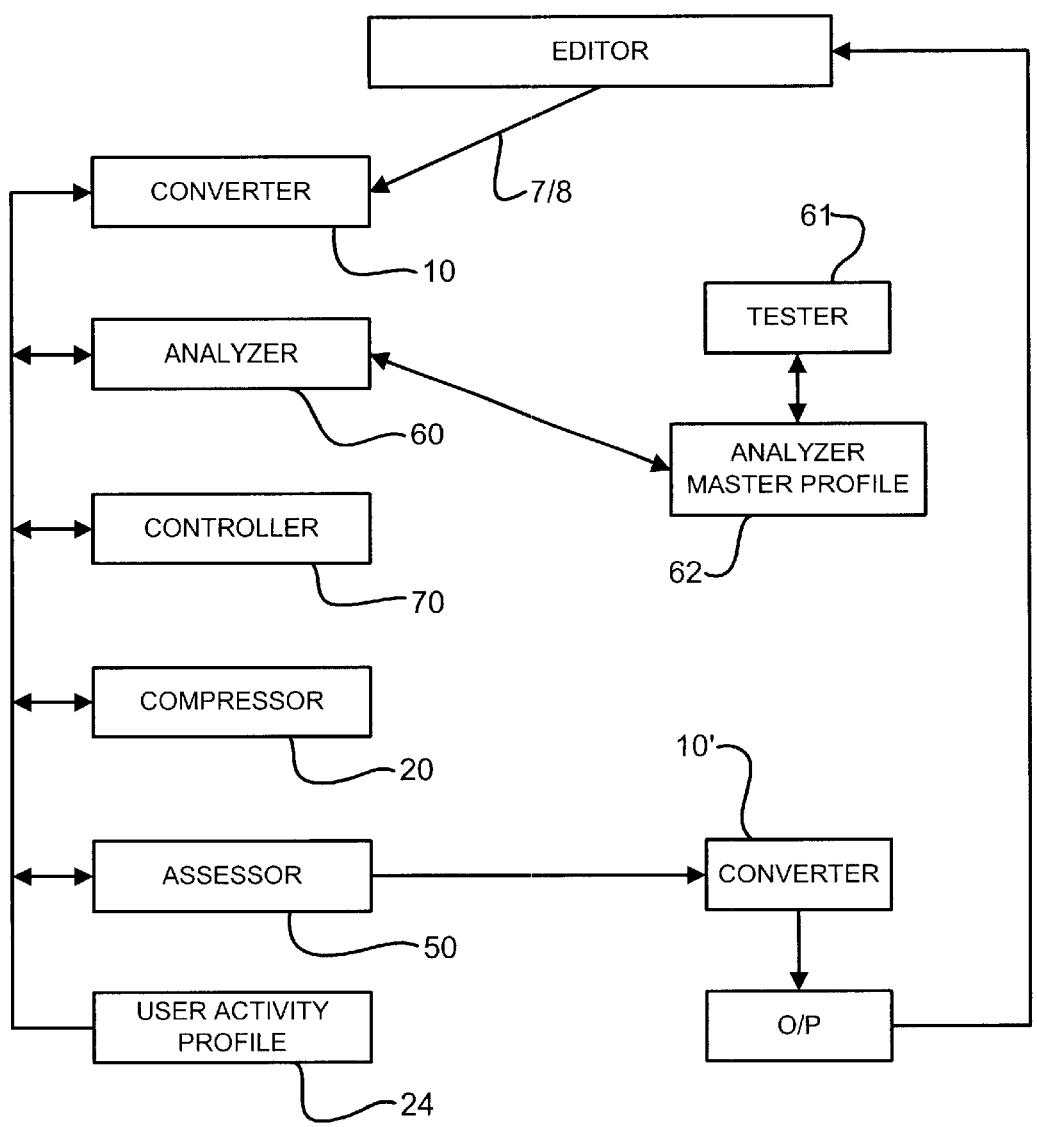
FIG. 20 is a schematic diagram showing the operational links between the components of a control system for controlling a programming environment.

FIG. 20 shows an application relating to a Windows programming development tool which can run in the background of an editor E used for writing program code in order, inter alia, to track the programmer's use of the editor to audit what he tends to do right and wrong and to control the process of program writing to inform of and/or correct errors. IconAuthor is one such example of object programming to which this can apply. In this application the code master profile has stored therein the programming language parameters including all the language's commands and syntax and the progression route master profile has stored therein aspects of the programming language's command sequences, such as the kinds of loop structures supported by the language. Input from the programmer via the editor E has the form of pairs of keyboard or mouse codes 7 and the corresponding button or editor codes 8 as explained further above in connection with the description of the first embodiment. For example, each button may be associated with a specific box or window used for data entry, e.g. to define a particular form of the programming command being generated from that button. The converter 10 is operable to identify false codes in the form of non-supported commands, with reference to the code master profile, and the compressor (not shown) serves to filter out, or at least bring to the programmer's attention, loop structures and the like which are not anticipated by the content of the progression route master profile. The analyzer 60 is operable with reference to the analyzer master profile 62, but not directly as described with reference to FIG. 8, but via a language rules tester 61.The tester 61 contains the logical rules defining the programming language and tests whether the content of the activity record provided by the analyzer 60, which reflect the code lines entered by the programmer, conform to the language rules. If there is conformity with the language rules, then reference is made to the analyzer master profile 62. If there is not conformity with the language rules, then there is non-compilable code in the activity record so that reference to the analyzer master profile is prevented and the programming error flagged to the programmer via an internal command to the coordinator 30.

As explained in connection with FIG. 8, the analyzer 60 analyses the user activity profile 24 with reference to an analyzer master profile 62 and writes to a user specific set-up profile 64 which defines the configuration of the editor which the programmer is using to create the program code in a user-specific manner. In use, the assessor 50 has the role of outputting to the editor, and thus the screen, any modifications to the code written by the programmer in the editor. In this respect, the assessor 50 outputs the code modifications via a back-converter 10' which performs the reverse process of the converter 10 described with reference to FIGS. 4 and 5, in that the back-converter 10' translates the activity codes used by the process monitoring system back into the strings used in the editor E to symbolize the programming language commands and other syntax. The back-converter thus serves to provide an editor output O/P to modify the editor file and thus change the code presented to the programmer on the screen.

The operation of the editor is thus tailored to each user on the basis of the analysis of the user's past programming activity and the process monitoring systems evaluation of it. The controller 70 is operable to intervene in the running of the editor as described further above with reference to FIG. 8. From the standpoint of the user, the enhancement of the conventional editor provided by the application of the first embodiment shown in FIG. 20 thus appears as a combination of syntax checker and on-line pre-compiler. The enhancement is provided by measurement of text, the process being monitored being the user generation of text in the form of program code. Versions of this application can be created for any programming language, for example any object oriented programming languages such as OLE and DDE.

Figure 21:
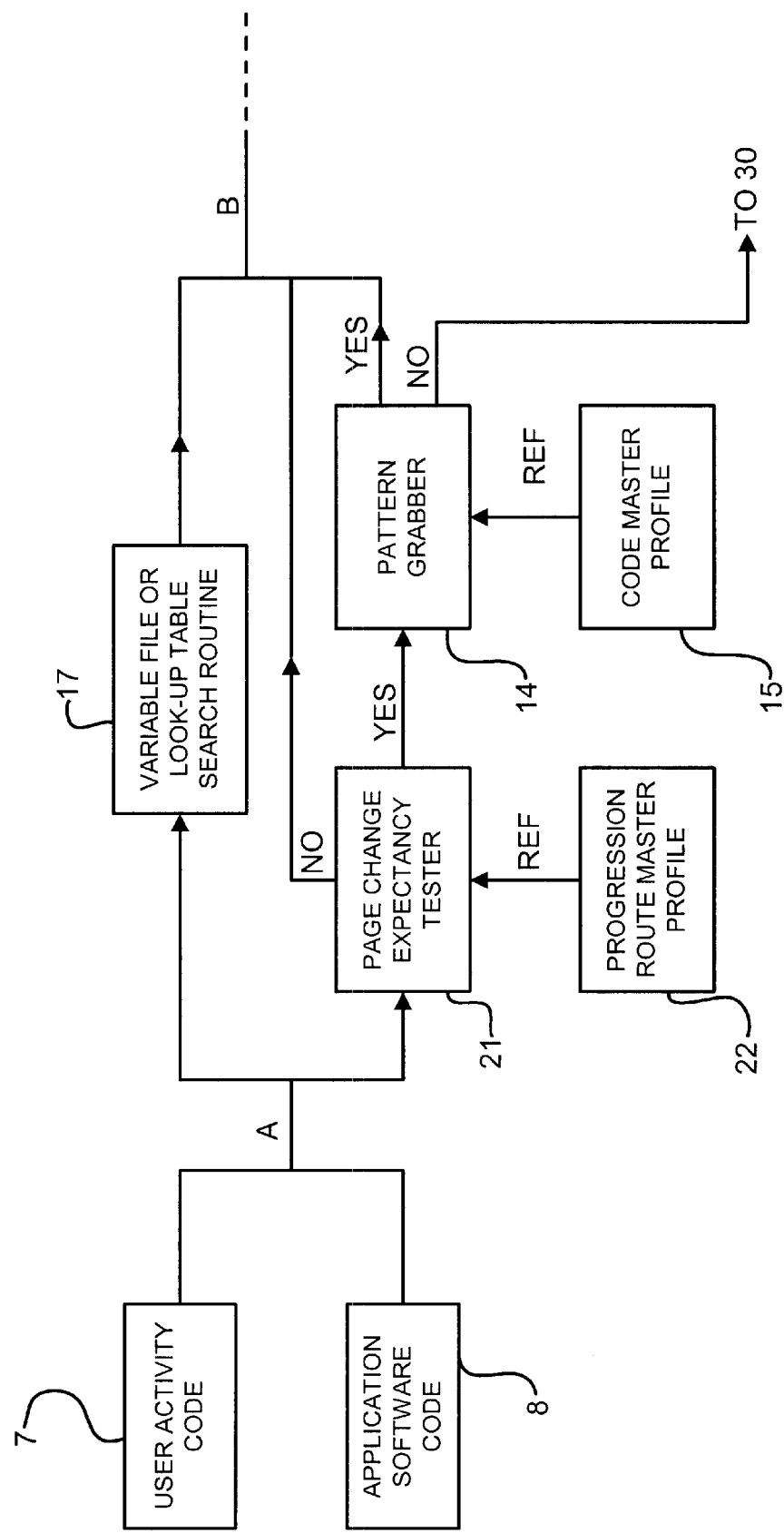
FIG. 21 is a schematic diagram of a modification of the converter of FIGS. 4 and 5.

FIG. 21 is a schematic diagram of a modification of the converter of the first embodiment shown in FIGS. 4 and 5. The modified converter differs from the converter of the first embodiment in respect of "step 1" shown in FIG. 5. FIG. 21 illustrates this modified structure of the input side of the converter up to the end of "step 1" at point "B" whereafter the converter follows the structure shown in FIG. 5.

In addition to the functions of the converter of the first embodiment, the modified converter supports a pattern or fingerprint recognition facility for recognising patterns or data sets, for example as a means of identifying position in application software as a check on progress and to enable, say, the software auditing to recommence from an identified position when it might otherwise have got lost. In a preferred embodiment, one uses screen patterns or fingerprints in terms of selected elements of the data set concerned, the data set comprising defined screen components and their attributes. In FIG. 21, the upper branch of step 1 illustrates the code pairing function, which is the same as that performed by step 1 of the first embodiment shown in FIG. 4, i.e. is performed by a variable file or look-up table search routine 17. The lower branch of step 1 illustrates the additional pattern recognition function. This pattern recognition function is illustrated in FIG. 21 as being performed in parallel with the code pairing function, but these two functions may instead be arranged in sequence, i.e. one after the other, in the flow.

In one embodiment of monitoring system operating with the modified converter, there is stored, preferably in the code master profile records, a field or fields defining a screen fingerprint in terms of a selection of elements from its components and their attributes the selection being such as to define the screen that exists corresponding to the record concerned. In the example of a monitoring system configured to monitor application software using windows, the fingerprint may be a set of screen features unique to a given screen generated by the application software at a specific point in the progression of the software and which are present on and read from the message queue of the system. The screen features in this embodiment are what is called in Borland Delphi components together with their attributes, and these include elements from the following set:

Components
  1. Child windows
  2. Enabled child windows
  3. Visible child windows
  4. Buttons
  5. Icons Attributes
  6. Text or numerical data contained in windows, buttons or icons of components 1 to 5
  7. x and y coordinates of components 1 to 5
  8. Labels of components 1 to 5
  9. Graphics attributes Typically for each screen all of the windows, buttons, icons etc. present in each screen will be included as the components. The graphics attributes may include attributes for each of the windows of the screen concerned. Graphics attributes may for example be contrast, brightness and/or palette. Moreover, the components may contain invisible as well as visible windows, icons or buttons, and non-active as well as active (i.e. enabled) windows.

The definition of a pattern or fingerprint provided by the collated components and attributes is configured so as to be sufficient to define uniquely a single point in the process being monitored, this point being defined in the monitoring system by associating each fingerprint with a point in the progression route master profile.

The lower branch in FIG. 21 of the modified converter operates as follows. The first step is performed by a page change expectancy tester 21 which is triggered by receipt of a user activity code to refer to the progression route master profile 22 and determine from the activity record if a page change is currently expected. If no page change is expected, then the flow continues to point B and on to step 2 of the converter flow, as shown in FIG. 5. On the other hand, if the test at 21 results in a result of 'page change expected', then the flow continues to a pattern grabber 14. The pattern grabber analyses from the message queue the pattern currently generated by the process being monitored, for example the relevant components of the current screen of an application software. The analysis generates a current pattern record having the same structure as the pattern or fingerprint field or fields in the code master profile. The thus created current pattern record is then compared with the fingerprint data stored in the code master profile that is associated with the expected new page obtained from the progression route master profile. If there is a match between the current record and the stored data for the point in the process flow expected, then an OK result is determined, since the process is running in a manner anticipated by the progression route master profile. The flow then continues to point B and on to step 2 of the converter flow, as shown in FIG. 5.

On the other hand, if there is a mismatch, then the process is running in a manner which is not anticipated by the progression route master profile, in which case the flow may jump out of the converter and to the coordinator 30. Preferably, the pattern grabber 14 performs a search of the code master profile to attempt to find a match with the current pattern record and, if a match is found, use the progression route master profile to obtain a definition of the unexpected, current point in the process flow. This definition is then utilised by the coordinator in the context of the functions described further below. The jump to the coordinator 30 may be effected after completion of the flow through the converter 10, via branch 33 as shown in FIG. 4. Alternatively, the jump may be effected immediately on a mismatch result in the unit 14. The coordinator can then for example generate a code to initiate user prompt to ask if the process is to proceed in the non-envisaged route, or whether the previous user activity code or codes is or are to be annulled. Depending on the user response, the coordinator will then generate appropriate process control commands, for example application software codes, to reinitiate the process being monitored in the manner desired by the user. These codes are found as a result of finding the record in the master profile that contains the pattern concerned. That record contains the data to initiate the required operation(s).

Each set of pattern data stored in the progression route master profile can thus be considered to be a fingerprint for uniquely identifying a given point in the flow of a process which is to be monitored.

The pattern recognition capability can serve further to enhance the reliability of the process monitoring, since the pattern checking provides an additional test at the converter level (which is a low level that will typically run in real-time) that the process is running in an appropriate manner. In this respect, for computer applications of the process monitoring system, conventional pattern recognition, of graphics for example, would in most cases be impractical owing to the computational intensity involved. With the above-described system however the pattern recognition is performed by means of the identities and attributes of a defined set of components of an event or screen and thus can, in many cases, be implemented with a modest amount of computation.

In examples in which the modified monitoring system with the pattern recognition capability is used to monitor application software driven processes, the pattern data will typically contain parameter values of components of the screens presented to the user on a display as described above. However, patterns signifying other kinds of data may be used in some applications. One application will now be described with reference to FIG. 22.

A summary of an exemplary design of the above-described process monitoring system as a program to run on a computer using a windows operating system is now described. The user interface is constituted by keyboard and mouse, on the user side, and a windows application on the process side. Monitoring of the user interface utilizes the "hook" debugging procedures which are part of the Windows API. Other techniques such as peeking are also possible but may be less reliable. In this way every user activity code, i.e. mouse or keyboard message, destined for the windows application is first passed to the hook routines in the converter. The hook procedure may simply take a copy of the message and send it to the main facilitator (effectively a hidden window) for processing. It is also possible to embed this logic into the hook procedure itself so that the message is withheld from the application until the process monitoring system has finished processing it. At this stage, the message can be terminated if appropriate so that it never reaches the application. Since all windows messages are tagged with various data items such as the x,y coordinate of the cursor when the message was generated, the process monitoring system can use the screen pattern records to establish which screen control has been clicked on (all windows controls are windows in their own right) based on the listed controls' screen position and size. The action associated with that particular control can then be established. If the control cannot be mapped, i.e. is not envisaged in the progression route master profile, the previous screen jump can be defined as a "blind jump". However, the process monitoring system can regain its bearings by use of the screen pattern recognition facility in that it can ascertain the process position associated with the new screen with reference to the code master profile and then resume process monitoring.

Moreover, there is a further group of applications of the above-described process monitoring system which can be referred to as process testing applications. In these applications the progression route and code master profiles are known to be definitive in that they define how the process should progress. For example, they may embody a design specification from which the process concerned has been subsequently developed. The process monitoring system can then be used to test by monitoring that the process fulfils the design requirements, since any deviance from envisaged process progression routes will represent an error in the process. Such testing applications may be especially useful for testing processes which are required to have a high reliability.

Figure 22:
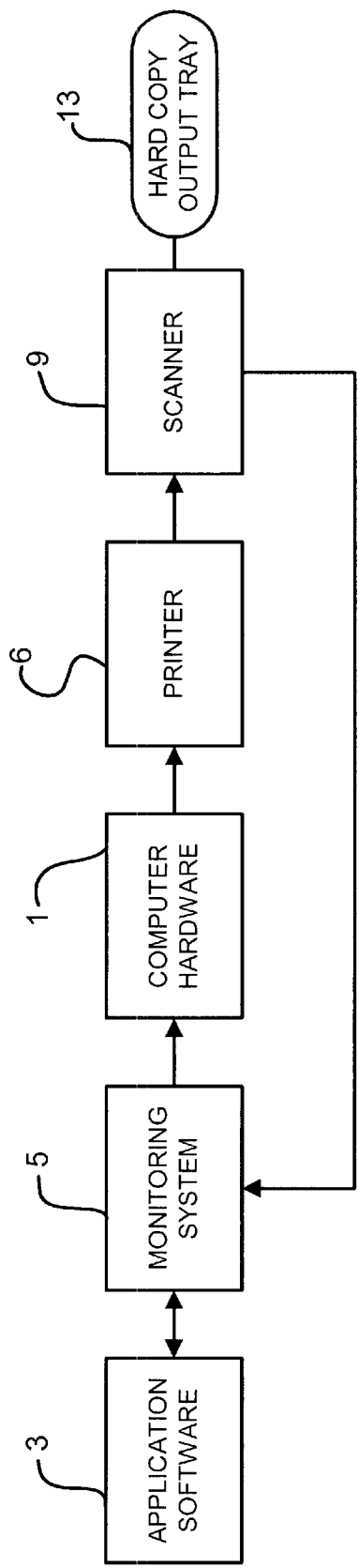
FIG. 22 is a schematic diagram showing the operational links between the components of a control system for controlling the hard copy print out from a printer using the modified converter of FIG. 21.

FIG. 22 is a schematic diagram showing the operational links between the components of a process monitoring and control system for monitoring and controlling the hard copy print out from a printer 6 using application software which is a painting package. The objective is to ensure that colours and colour mixes selected by a user are converted into the correct colours by the printer.

In a conventional computer system, software such as application software, will typically generate print data and printer codes or commands to allow for hard copy print out of files, graphics etc. The print commands from the application software will be interpreted by a printer driver, as a hardware I/O device, and output in printer command form to a printer which then outputs the hard copy to an output tray.

In the computer system of FIG. 22, such a conventional computer system is equipped with a monitoring and control system having a pattern recognition capability of the kind described in FIG. 21.

A monitoring system 5 is interposed between the application software 3 and a printer driver 1 to monitor print command writes from the application software. The application software in this example is a drawing and painting package in which a palette of International Standard colours is used. The operator is provided with a series of buttons to select corresponding colours and other screen objects to select colour mixing proportions. The converter operates to give the grabber function of FIG. 21 as follows.

The operator activities will thus include a series of operator mouse clicks (generating activity codes) in selecting a corresponding series of buttons defining different colours and relative proportions thereof to generate the application software codes. This will provide the raw session file data. Position data is also generated in this way as the operator draws an object, coordinate-by-coordinate. The condenser will act to pattern grab in that it will generate records defining the colours, their proportions and detailed position data, these records pertaining to respective objects.

In this application, the page change expectancy tester 21 is configured to define a page change as a print-out command, i.e. to recognize user activity codes which initiate a printing action.

In use, the print commands issued from the application software pass from the monitoring system 5 to the printer driver 1 and on to the printer 6 which prints a hard copy. The actual commands to create the correct colours are determined by a master code file which defines the commands corresponding to the colours required (assuming the printer has been calibrated previously—described below) and is operating correctly. The hard copy is then scanned by a scanner 9 interposed between the printer and a hard copy output tray 13. The scanner 9 is operable to scan in, at least partially, the printed hard copy to generate hard copy data which is transmitted to the monitoring system 5 via a data communication line.

The hard copy data received by the monitoring system 5 via the data communication line is input to a pattern grabber to extract the current pattern data as defined by the hard copy print-out, as measured by the scanner 9. The components of the pattern in this example may be contrast, brightness and colour. The pattern grabber then compares the measured components of the current pattern with those stored in the relevant session file.

If there is a match between the attributes, then an OK result is determined, indicating that the printing process is running as desired. The flow can then continue to point B and on to step 2 of the converter flow, as shown in FIG. 5. In this case, the monitoring and control system 5 does not intervene in the printing process.

On the other hand, if the test determines that there is a mismatch between the attributes, then a NOT OK result is determined, indicating that the printing process is generating hard copy that deviates from what is intended. For example, in a monochrome print-out, contrast may be insufficient. In a four-colour colour print-out, one or more of the printer colours may be too weak for example.

Having derived this result from the monitoring of the printing activity, the monitoring and control system 5 can be configured to intercept and change subsequent print commands to compensate for the printing deficiency. For example, brightness levels of certain of the colours may be increased on the basis of the monitoring results. Alternatively, the same effect may be achieved by the monitoring and control system 5 issuing appropriate set-up commands to the printer. The monitoring and control system 5 may also issue commands to the application software via the coordinator 30. For example, the coordinator 30 can issue a command to the application software to present a 'contrast low' message to the user. More particularly this data can be used to alter the master code file to recalibrate the colours.

For initial calibration, a test palette print will be produced showing each unmixed colour of the palette and the scanner feedback will be used to produce the "correct" printer codes in the master code file.

The condensed file for that print can stored and used to regenerate that picture at a later date.

In the above reference has been made to mouse codes as an example of the possible user activity codes. It will be understood that this may include all codes that may be generated by a mouse. For example, 'down' and 'up' commands for each of left, right and middle mouse buttons, mouse x and y coordinates, mouse shape and change shape. Similarly all keyboard codes may provide user activity codes monitored by the above described system. Other means for generating user activity codes are touch screens, speech recognition modules, or any means by which user commands are input.

What is claimed is:

1. A system for operating alongside a user controlled process for monitoring the activities of such a process, the system comprising:

a modifiable software progression route master profile file defining a master profile of envisaged routes of progression through the process in terms of process codes corresponding to codes generated by the process at steps of the process;

means for coupling the system to the process to obtain therefrom and sequentially store the process codes;

means for comparing the stored sequence of process codes against the master profile to determine the position in the process at which each process code was generated and the appropriateness of the performance of the process step associated with the process code concerned at the determined process position; and means for writing data representing the determined position and appropriateness for each process code to a user activity profile file for recording the activities of the process for the user concerned.

2. The system according to claim 1, comprising:

means defining a code master profile of pairs of first and second codes, the first codes being codes corresponding to codes generated by user input to the process and the second codes being codes corresponding to the codes generated by the process in response to the user generated codes;

means arranged to compare a pair of user and process generated codes with the code master profile to deduce whether the process generated code of that pair is recognized as being one of the second codes defined in the master profile;

means for establishing the context of the process generated code wherein in the case that the process generated code has not been recognized by the comparing means a false context state is established and, in the case in which a process generated code has been recognized by the comparing means, either a true context state is established if the recognized process generated code is deemed to have been produced in an appropriate context having regard to a correlation between the user generated input code and the first code of the code master profile pair associated with the recognized process code, else a false context state is established; and means arranged to store in a user session file a record comprising an activity code specific to each recognized process generated code and the associated context state determined by the context establishing means.

3. The system according to claim 1 and comprising means for changing the manner in which the process is influenceable by the user on the basis of the user session file.

4. the system according to claim 1 and comprising means for changing the manner in which the process operates on the basis of the user session file.

5. The system according to claim 1 and comprising means for changing the manner in which the process operates on the basis of the user activity profile file.

6. The system according to claim 1 and comprising means for changing the manner in which the process is influenceable by the user on the basis of the user activity profile file.

7. The system according to claim 1 and comprising means for analyzing the contents of the user activity profile file and means for writing data relating to the analyzed contents of the user activity profile file to a process activity file.

8. The system according to claim 7, and comprising means for changing the code master profile on the basis of the process activity file, whereby the manner in which the user profile file analyzing means analyzes user profile files is changed.

9. The system according to claim 1, wherein the process includes computer windowing and wherein each of a plurality of points in the process being monitored is associated with a screen data set unique to a screen associated with that point in the process and there are stored for those points a plurality of screen fingerprints each comprising a selection of elements of the data set concerned to define the associated point in the process, the system comprising:
means for generating the said screen fingerprint of the current point of the process being monitored;
means for comparing the current screen fingerprint with that one of the stored screen fingerprints associated with the current point in the process; and means for deducing whether the compared current and stored fingerprints match.

10. The system according to claim 9 and comprising means for changing the manner in which the process proceeds if the compared current and stored fingerprints are deduced not to match, those means comprising means for establishing the expected current point in the process being monitored by referring to the progression route master profile.

11. The system according to claim 9, wherein the data set comprises computer window components, such as child windows, and their attributes.

12. The system according to claim 2, wherein the master profile file of envisaged progression routes through the process is defined in terms of said set of activity codes and associated process step sequence numbers.

13. The system according to claim 1, wherein defined process codes or responses comprise fingerprints of screens existing at the process positions concerned, such fingerprints comprising items selected from a set of window components, such as child windows and buttons.

14. The system for monitoring the activities of a process controlled by a user, the system comprising:
means defining a master profile of a predetermined set of user activities and corresponding process responses;
means for comparing actual activity and any corresponding responses with the defined set to convert such activity and responses which have correspondences with the predetermined set into activity codes;
means defining a progression route master profile of a predetermined set of activity codes with position data corresponding to desired positions of the activities concerned in the process;
means for comparing the actual activity codes with the predetermined set of activity codes to determine a correlation between the actual sequence of activities codes and the sequence of the defined activity codes of the predetermined set.

15. The system for monitoring the activities of a process controlled by a user, the system comprising:
means defining a master profile of pairs of first and second codes, the first codes being codes corresponding to codes generated by user input to the process and the second codes being codes corresponding to the codes generated by the process in response to the user generated codes;
means arranged to compare a pair of user and process generated codes with the master profile to deduce whether the process generated code of that pair is recognized as being one of the second codes defined in the master profile;
means for establishing the context of the process generated code wherein in the case that the process generated code has not been recognized by the comparing means a false context state is established and, in the case in which a process generated code has been recognized by the comparing means, either a true context state is established if the recognized process generated code is deemed to have been produced in an appropriate context having regard to a correlation between the user generated input code and the first code of the code master profile pair associated with the recognized process code, else a false context state is established; and
means arranged to store in a user activity file a record comprising an activity code specific to each recognized process generated code and the associated context state determined by the context establishing means.

16. The system according to claim 15 and comprising:
means defining a further master profile of envisaged progression routes through the process in terms of said set of activity codes and associated process step sequence numbers;
means for analyzing the contents of the user activity file with reference to the progression route master profile; and
means for writing data relating to the analyzed contents of the user activity file to a user profile file.

17. The system according to claim 14, wherein defined process codes or responses comprise fingerprints of screens existing at the process positions concerned, such fingerprints comprising items selected from a set of window components, such as child windows and buttons.

18. The system according to claim 15, wherein defined process codes or responses comprise fingerprints of screens existing at the process positions concerned, such fingerprints comprising items selected from a set of window components, such as child windows and buttons.

* * * * *